(12) United States Patent
 Gilson

(10) Patent No.: US 12,659,173 B2
(45) Date of Patent: Jun. 16, 2026

(54) SYSTEMS AND METHODS FOR MANAGING DIGITAL RIGHTS

(71) Applicant: Comcast Cable Communications, LLC, Philadelphia, PA (US)

(72) Inventor: Ross Gilson, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 33 days.

(21) Appl. No.: 18/771,365

(22) Filed: Jul. 12, 2024

(65) Prior Publication Data

US 2024/0364537 A1 Oct. 31, 2024

Related U.S. Application Data

(63) Continuation of application No. 17/745,721, filed on May 16, 2022, now Pat. No. 12,074,984, which is a continuation of application No. 15/657,848, filed on Jul. 24, 2017, now Pat. No. 11,362,834.

(51) Int. Cl.
| | |
|---|---|
| *H04L 9/32* | (2006.01) |
| *G06F 12/0813* | (2016.01) |
| *G06F 12/0864* | (2016.01) |
| *G06F 12/14* | (2006.01) |
| *H04L 9/00* | (2022.01) |
| *H04L 9/06* | (2006.01) |

(Continued)

(52) U.S. Cl.
CPC ........ *H04L 9/3247* (2013.01); *G06F 12/0813* (2013.01); *G06F 12/0864* (2013.01); *G06F 12/1408* (2013.01); *H04L 9/0618* (2013.01); *H04L 9/088* (2013.01); *H04L 9/0894*

(2013.01); *H04L 9/3239* (2013.01); *H04L 63/0471* (2013.01); *H04L 63/061* (2013.01); *G06F 2212/1052* (2013.01); *G06F 2212/6032* (2013.04); *H04L 9/50* (2022.05); *H04L 2209/603* (2013.01)

(58) Field of Classification Search
CPC ..... H04L 9/3247; H04L 9/0618; H04L 9/088; H04L 9/0894; H04L 9/3239; H04L 63/0471; H04L 63/061; H04L 9/50; H04L 2209/603; G06F 12/0813; G06F 12/0864; G06F 12/1408; G06F 2212/1052; G06F 2212/6032
See application file for complete search history.

(56) References Cited

U.S. PATENT DOCUMENTS

| | | | |
|---|---|---|---|
| 7,366,306 B1 * | 4/2008 | Trimberger | ......... G06F 12/1425 380/278 |
| 8,086,698 B2 | 12/2011 | Rakowski et al. | |
| 8,185,550 B1 | 5/2012 | Eichler et al. | |

(Continued)

OTHER PUBLICATIONS

US Patent Application filed on May 16, 2022, entitled "Systems and Methods for Managing Digital Rights", U.S. Appl. No. 17/745,721.

*Primary Examiner* — Aravind K Moorthy
(74) *Attorney, Agent, or Firm* — BakerHostetler

(57) ABSTRACT

Systems and methods are described for managing digital rights. A transaction may be generated and may comprise an identifier and a decryption key. The decryption key may be configured to decrypt at least a portion of an encrypted content asset accessible by one or more user devices. The transaction may be caused to be stored in a distributed database.

22 Claims, 12 Drawing Sheets

(51) Int. Cl.

| | |
|---|---|
| *H04L 9/08* | (2006.01) |
| *H04L 9/40* | (2022.01) |

(56) References Cited

U.S. PATENT DOCUMENTS

| | | | |
|---|---|---|---|
| 8,479,304 B1 | 7/2013 | Clifford | |
| 9,167,207 B1 | 10/2015 | Drewry et al. | |
| 9,224,145 B1 | 12/2015 | Evans et al. | |
| 9,349,127 B2 * | 5/2016 | Hurry | G06Q 20/3829 |
| 9,397,985 B1 | 7/2016 | Seger et al. | |
| 9,515,822 B2 * | 12/2016 | Pizano | H04L 9/321 |
| 9,824,031 B1 | 11/2017 | Ganti et al. | |
| 9,875,510 B1 * | 1/2018 | Kasper | G06Q 40/12 |
| 9,924,418 B1 | 3/2018 | Cuberovic | |
| 10,078,773 B1 * | 9/2018 | Vyas | G06Q 20/00 |
| 10,114,969 B1 * | 10/2018 | Chaney | G06F 21/64 |
| 10,158,480 B1 | 12/2018 | Winklevoss et al. | |
| 10,169,937 B1 | 1/2019 | Zwink et al. | |
| 10,289,809 B1 * | 5/2019 | Hesselink | H04N 21/4627 |
| 10,387,874 B1 * | 8/2019 | Birand | G06Q 20/385 |
| 10,404,471 B1 * | 9/2019 | Griffin | H04L 63/123 |
| 10,423,961 B1 * | 9/2019 | El Defrawy | G06Q 20/065 |
| 10,439,815 B1 * | 10/2019 | Poder | H04L 9/3236 |
| 10,476,665 B1 * | 11/2019 | Griffin | H04L 9/3263 |
| 10,554,649 B1 * | 2/2020 | Fields | H04L 9/3263 |
| 10,602,094 B1 * | 3/2020 | Longo | G06F 21/10 |
| 10,833,843 B1 | 11/2020 | Vijayvergia et al. | |
| 10,979,410 B1 * | 4/2021 | Byrd | H04L 63/0428 |
| 11,025,409 B1 * | 6/2021 | Fields | H04L 9/30 |
| 11,120,437 B2 | 9/2021 | Wright et al. | |
| 11,188,907 B1 * | 11/2021 | Vijayvergia | G06Q 20/023 |
| 11,270,274 B1 | 3/2022 | Kurani | |
| 11,362,834 B2 * | 6/2022 | Gilson | H04L 9/3239 |
| 11,526,893 B2 | 12/2022 | Poole | |
| 11,574,300 B1 * | 2/2023 | Kurani | G06Q 20/3274 |
| 11,681,781 B2 * | 6/2023 | Park | H04L 9/0894 |
| | | | 713/171 |
| 11,831,748 B1 * | 11/2023 | Fisher | G06Q 20/389 |
| 12,052,343 B2 * | 7/2024 | Park | H04L 9/0819 |
| 12,074,984 B2 * | 8/2024 | Gilson | G06F 12/1408 |
| 12,192,236 B2 * | 1/2025 | Srinivasan | H04L 63/166 |
| 2002/0152387 A1 | 10/2002 | Asano | |
| 2003/0012383 A1 | 1/2003 | Bernstein et al. | |
| 2004/0133699 A1 * | 7/2004 | Hashem | H04L 9/40 |
| | | | 709/206 |
| 2004/0151323 A1 * | 8/2004 | Olkin | H04L 63/062 |
| | | | 380/280 |
| 2004/0230540 A1 | 11/2004 | Crane et al. | |
| 2005/0021477 A1 | 1/2005 | Krishnan et al. | |
| 2006/0015945 A1 | 1/2006 | Fields | |
| 2007/0074270 A1 | 3/2007 | Meehan et al. | |
| 2007/0255662 A1 | 11/2007 | Tumminaro | |
| 2008/0010449 A1 | 1/2008 | Holtzman et al. | |
| 2008/0010452 A1 | 1/2008 | Holtzman et al. | |
| 2008/0279534 A1 | 11/2008 | Buttars | |
| 2008/0304669 A1 | 12/2008 | Bugbee | |
| 2009/0123131 A1 | 5/2009 | Morioka | |
| 2009/0165096 A1 | 6/2009 | Hughes et al. | |
| 2009/0187771 A1 * | 7/2009 | McLellan, Jr. | H04L 9/0891 |
| | | | 713/193 |
| 2009/0210720 A1 | 8/2009 | Chen et al. | |
| 2010/0138652 A1 | 6/2010 | Sela et al. | |
| 2011/0016327 A1 | 1/2011 | Suzuki et al. | |
| 2011/0093722 A1 | 4/2011 | Devanand | |
| 2012/0039469 A1 * | 2/2012 | Mueller | G06Q 20/204 |
| | | | 380/252 |
| 2012/0077432 A1 | 3/2012 | Rose et al. | |
| 2013/0054971 A1 | 2/2013 | Yamaguchi et al. | |
| 2013/0080571 A1 | 3/2013 | Kirkeby | |
| 2013/0091553 A1 | 4/2013 | Eom et al. | |
| 2013/0124866 A1 | 5/2013 | Farrugia et al. | |
| 2013/0191903 A1 | 7/2013 | Jaudon et al. | |
| 2013/0268999 A1 | 10/2013 | Kiang et al. | |
| 2013/0311780 A1 * | 11/2013 | Besehanic | H04L 63/0428 |
| | | | 713/176 |
| 2014/0051391 A1 | 2/2014 | Torres et al. | |
| 2014/0082324 A1 * | 3/2014 | Elhamias | G06F 12/0862 |
| | | | 711/213 |
| 2014/0169554 A1 | 6/2014 | Scarisbrick et al. | |
| 2015/0036928 A1 | 2/2015 | Sheth et al. | |
| 2015/0046994 A1 | 2/2015 | Sinha et al. | |
| 2015/0082399 A1 | 3/2015 | Wu et al. | |
| 2015/0095637 A1 | 4/2015 | Liddicott | |
| 2015/0095987 A1 | 4/2015 | Potash et al. | |
| 2015/0120567 A1 | 4/2015 | Van et al. | |
| 2015/0134962 A1 | 5/2015 | Mahajan et al. | |
| 2015/0180671 A1 | 6/2015 | Yamashita | |
| 2015/0269570 A1 | 9/2015 | Phan et al. | |
| 2015/0271147 A1 | 9/2015 | Tanizawa et al. | |
| 2015/0287432 A1 | 10/2015 | Nakano et al. | |
| 2015/0288694 A1 * | 10/2015 | Liebl, III | H04L 9/3247 |
| | | | 713/182 |
| 2015/0295904 A1 | 10/2015 | Elias et al. | |
| 2015/0310424 A1 * | 10/2015 | Myers | G06Q 20/401 |
| | | | 705/69 |
| 2015/0332262 A1 * | 11/2015 | Lingappa | G06Q 20/3823 |
| | | | 705/71 |
| 2015/0350189 A1 | 12/2015 | Shin et al. | |
| 2015/0372754 A1 | 12/2015 | Choi et al. | |
| 2016/0012399 A1 | 1/2016 | Etchegoyen | |
| 2016/0092988 A1 | 3/2016 | Letourneau | |
| 2016/0104187 A1 | 4/2016 | Tietzen et al. | |
| 2016/0112376 A1 | 4/2016 | Gomez et al. | |
| 2016/0142402 A1 | 5/2016 | Kim | |
| 2016/0196553 A1 * | 7/2016 | Barhydt | G06Q 20/3829 |
| | | | 705/44 |
| 2016/0234026 A1 | 8/2016 | Wilkins et al. | |
| 2016/0259937 A1 | 9/2016 | Ford et al. | |
| 2016/0261404 A1 * | 9/2016 | Ford | H04L 67/104 |
| 2016/0292234 A1 | 10/2016 | Kathewadi | |
| 2016/0299918 A1 * | 10/2016 | Ford | G06Q 20/382 |
| 2016/0307197 A1 * | 10/2016 | Roeill | G06Q 40/04 |
| 2016/0342977 A1 * | 11/2016 | Lam | G06Q 20/0658 |
| 2016/0342994 A1 | 11/2016 | Davis | |
| 2016/0350749 A1 | 12/2016 | Wilkins et al. | |
| 2016/0379210 A1 | 12/2016 | Pandey | |
| 2017/0005804 A1 | 1/2017 | Zinder | |
| 2017/0034170 A1 | 2/2017 | Huang et al. | |
| 2017/0046689 A1 | 2/2017 | Lohe et al. | |
| 2017/0046698 A1 | 2/2017 | Haldenby et al. | |
| 2017/0046792 A1 | 2/2017 | Haldenby et al. | |
| 2017/0048216 A1 | 2/2017 | Chow et al. | |
| 2017/0093572 A1 | 3/2017 | Hunt et al. | |
| 2017/0099136 A1 | 4/2017 | Straub et al. | |
| 2017/0116693 A1 * | 4/2017 | Rae | G06Q 50/184 |
| 2017/0118210 A1 | 4/2017 | Athias | |
| 2017/0124556 A1 | 5/2017 | Seger, II | |
| 2017/0155515 A1 | 6/2017 | Androulaki et al. | |
| 2017/0168954 A1 | 6/2017 | Meyer et al. | |
| 2017/0177898 A1 * | 6/2017 | Dillenberger | H04L 9/3236 |
| 2017/0206372 A1 | 7/2017 | Jung | |
| 2017/0208149 A1 | 7/2017 | Crasta et al. | |
| 2017/0208461 A1 | 7/2017 | Yin | |
| 2017/0213209 A1 | 7/2017 | Dillenberger | |
| 2017/0214522 A1 * | 7/2017 | Code | G06F 21/64 |
| 2017/0214693 A1 | 7/2017 | Bao et al. | |
| 2017/0230189 A1 | 8/2017 | Toll et al. | |
| 2017/0232300 A1 * | 8/2017 | Tran | G06F 1/163 |
| | | | 434/247 |
| 2017/0236104 A1 * | 8/2017 | Biton | G06Q 20/389 |
| | | | 705/64 |
| 2017/0237554 A1 | 8/2017 | Jacobs et al. | |
| 2017/0250972 A1 | 8/2017 | Ronda et al. | |
| 2017/0257358 A1 * | 9/2017 | Ebrahimi | H04L 9/3236 |
| 2017/0264428 A1 * | 9/2017 | Seger, II | H04L 9/3239 |
| 2017/0279783 A1 * | 9/2017 | Milazzo | H04L 9/14 |
| 2017/0295232 A1 | 10/2017 | Curtis | |
| 2017/0300627 A1 * | 10/2017 | Giordano | G06F 21/6245 |
| 2017/0300842 A1 | 10/2017 | Pembery | |
| 2017/0300901 A1 * | 10/2017 | Kote | H04L 63/062 |
| 2017/0300912 A1 | 10/2017 | Narasimhan et al. | |
| 2017/0324560 A1 | 11/2017 | Pesonen et al. | |
| 2017/0324738 A1 * | 11/2017 | Hari | H04L 61/5007 |
| 2017/0330174 A1 | 11/2017 | Demarinis et al. | |

(56)          References Cited

U.S. PATENT DOCUMENTS

| 2017/0331896 A1 | 11/2017 | Holloway et al. |
| 2017/0346639 A1 | 11/2017 | Muftic |
| 2017/0352031 A1 | 12/2017 | Collin |
| 2017/0352033 A1* | 12/2017 | Buckman ................. H04L 9/083 |
| 2017/0359343 A1 | 12/2017 | Sterl et al. |
| 2017/0364552 A1 | 12/2017 | Pattanaik et al. |
| 2018/0006826 A1 | 1/2018 | Smith et al. |
| 2018/0007546 A1 | 1/2018 | Anderson et al. |
| 2018/0032383 A1 | 2/2018 | Surcouf et al. |
| 2018/0082287 A1* | 3/2018 | Sheerin ................. H04L 9/3236 |
| 2018/0084042 A1* | 3/2018 | Finlow-Bates ..... H04L 67/1078 |
| 2018/0096163 A1 | 4/2018 | Jacques et al. |
| 2018/0097638 A1 | 4/2018 | Haldenby et al. |
| 2018/0097783 A1 | 4/2018 | Haldenby et al. |
| 2018/0114218 A1 | 4/2018 | Konik et al. |
| 2018/0115416 A1* | 4/2018 | Diehl ................... H04L 9/0819 |
| 2018/0117446 A1* | 5/2018 | Tran ........................ G06F 1/163 |
| 2018/0121918 A1* | 5/2018 | Higgins ............... G06Q 20/065 |
| 2018/0124053 A1 | 5/2018 | Mullender et al. |
| 2018/0130050 A1* | 5/2018 | Taylor ................. G06Q 20/065 |
| 2018/0137507 A1* | 5/2018 | Jayachandran ...... G06Q 20/401 |
| 2018/0137549 A1 | 5/2018 | Vadura et al. |
| 2018/0158051 A1* | 6/2018 | Arora ................. G06Q 20/3829 |
| 2018/0165698 A1 | 6/2018 | Chandrashekar et al. |
| 2018/0176206 A1 | 6/2018 | Matthews et al. |
| 2018/0191502 A1* | 7/2018 | Karame ................. H04L 63/12 |
| 2018/0197194 A1 | 7/2018 | Achhra et al. |
| 2018/0248880 A1 | 8/2018 | Sardesai et al. |
| 2018/0253702 A1 | 9/2018 | Dowding |
| 2018/0268504 A1* | 9/2018 | Paolini-Subramanya ................... G06Q 20/3823 |
| 2018/0288033 A1* | 10/2018 | Kamal ................... G06Q 40/02 |
| 2018/0293363 A1 | 10/2018 | Asati et al. |
| 2018/0307855 A1 | 10/2018 | Dogu et al. |
| 2018/0313797 A1 | 11/2018 | Chokshi et al. |
| 2018/0315047 A1 | 11/2018 | Kennedy et al. |
| 2018/0322259 A1* | 11/2018 | Solow ................... H04L 9/0819 |
| 2018/0322587 A1* | 11/2018 | Linne ................... H04L 63/105 |
| 2018/0323975 A1 | 11/2018 | Curbera et al. |
| 2018/0337771 A1* | 11/2018 | Baker ................... H04L 9/3236 |
| 2018/0359095 A1 | 12/2018 | Asati et al. |
| 2018/0365691 A1 | 12/2018 | Sanders et al. |
| 2018/0375838 A1 | 12/2018 | Hersans et al. |
| 2019/0020648 A1* | 1/2019 | Haque ................. H04L 63/0823 |
| 2019/0163883 A1 | 5/2019 | Savanah et al. |
| 2019/0386829 A1 | 12/2019 | Karame et al. |
| 2020/0236140 A1* | 7/2020 | Srinivasan ............ H04L 5/0055 |
| 2020/0327252 A1 | 10/2020 | Mcfall et al. |
| 2021/0074120 A1* | 3/2021 | Ragnoni ............ G07F 17/3241 |
| 2021/0211468 A1* | 7/2021 | Griffin ...................... H04L 9/50 |
| 2021/0288944 A1* | 9/2021 | Petri ...................... H04L 67/14 |
| 2022/0148082 A1 | 5/2022 | Lacey |
| 2024/0119168 A1* | 4/2024 | Venkatesan ............. H04L 63/20 |
| 2024/0348424 A1* | 10/2024 | Goel ................... H04L 9/0891 |

* cited by examiner

Cause an encrypted
content asset to be
stored at a storage
location
910

Generate a
transaction comprising
an identifier and a
decryption key
920

Cause the
transaction to be
stored in a
distributed database
930

Receive an encrypted
content asset
1010

Receive an identifier
1020

Determine a location
of a transaction in a
distributed database
using the identifier
1030

Receive information
associated with the
transaction
1040

Decrypt at least a
portion of the
encrypted content
asset
1050

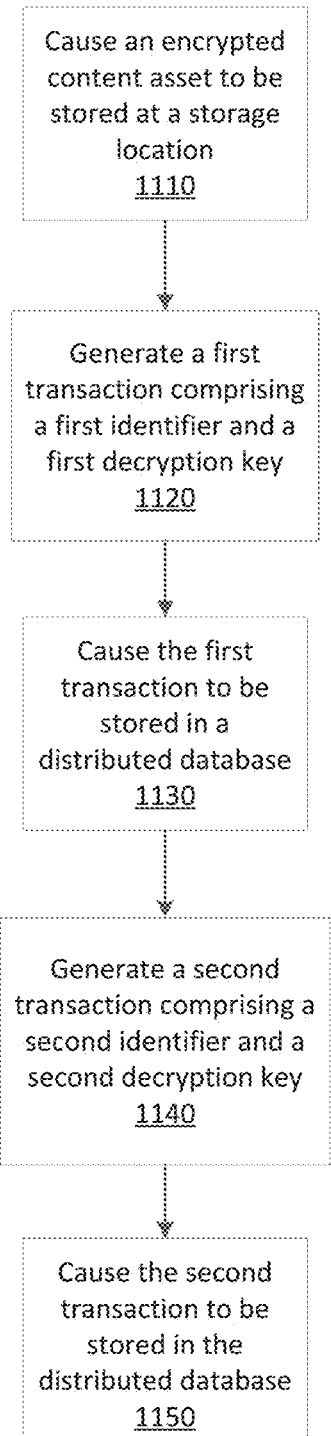

Cause an encrypted
content asset to be
stored at a storage
location
1110

Generate a first
transaction comprising
a first identifier and a
first decryption key
1120

Cause the first
transaction to be
stored in a
distributed database
1130

Generate a second
transaction comprising a
second identifier and a
second decryption key
1140

Cause the second
transaction to be
stored in the
distributed database
1150

FIG. 11

SYSTEMS AND METHODS FOR MANAGING DIGITAL RIGHTS

CROSS REFERENCE TO RELATED APPLICATIONS

This application is a continuation of U.S. patent application Ser. No. 17/745,721, filed May 16, 2022, now U.S. Pat. No. 12,074,984, issued Aug. 27, 2024, which is a continuation of U.S. patent application Ser. No. 15/657,848, filed Jul. 24, 2017, now U.S. Pat. No. 11,362,834, issued Jun. 14, 2022, each of which are hereby incorporated by reference for any and all purposes.

BACKGROUND

Management of rights associated with content may comprise controlling access to the content, for example, by modifying user access controls. For example, certain user accounts may be granted permissions to access content on a central server. However, a system of generating and authenticating such user accounts and managing account settings may be difficult to scale across multiple users. Further, a digital rights manager or content distributor may not have discrete control of the user accounts and may be required to rely on a third-party rights manager.

Further, the management of digital rights may comprise managing the storage of one or more content assets. For example, different versions of a content asset, such as abridged versions, extended versions, different bit rate versions, and the like, may be stored for user access. However, storing multiple copies or version of various content assets may consume large amounts of storage space and may further complicate the access control to such copies and versions across multiple users or user accounts.

SUMMARY

Systems and methods are described for managing digital rights. Digital rights may comprise access rights associated with one or more content assets. A rights holder may be or comprise an entity or a device that may be configured to control one or more of the distribution and access to the one or more content assets. A rights holder may be a source of the particular content asset or may be configured to manage access control associated with the particular content asset.

Certain content assets may be encrypted, for example, to enable secure access control over the content assets. An encrypted content asset may be stored at a storage location, which may be accessible by one or more users or user devices. However, a recipient of the encrypted content asset may not be able to consume the content asset without first decrypting the content asset.

A key (e.g., encryption key) may be configured to decrypt the encrypted content asset. The key may be made available (e.g., distributed) by storing the key in a distributed database, such as a distributed ledger or a blockchain. As an example, a rights holder or other entity or device may cause the key to be stored in a distributed database by generating a transaction configured for the distributed database. The transaction may comprise the key and an identifier. The identifier may be associated with the rights holder or the content asset, for example. The identifier may be used to determine a location of the transaction in the distributed database, for example, by searching the distributed database for the identifier. As such, the rights holder may transmit the identifier to one or more users to selectively enable access to the transaction. Recipients of the identifier may search the distributed database for the transaction associated with the identifier and may retrieve the key from the transaction. The key may be used to decrypt the content asset for playback or further processing.

BRIEF DESCRIPTION OF THE DRAWINGS

The following drawings show generally, by way of example, but not by way of limitation, various examples discussed in the present disclosure. In the drawings:

FIG. 11 is a flow diagram of an example method.

DETAILED DESCRIPTION

Figure 1:
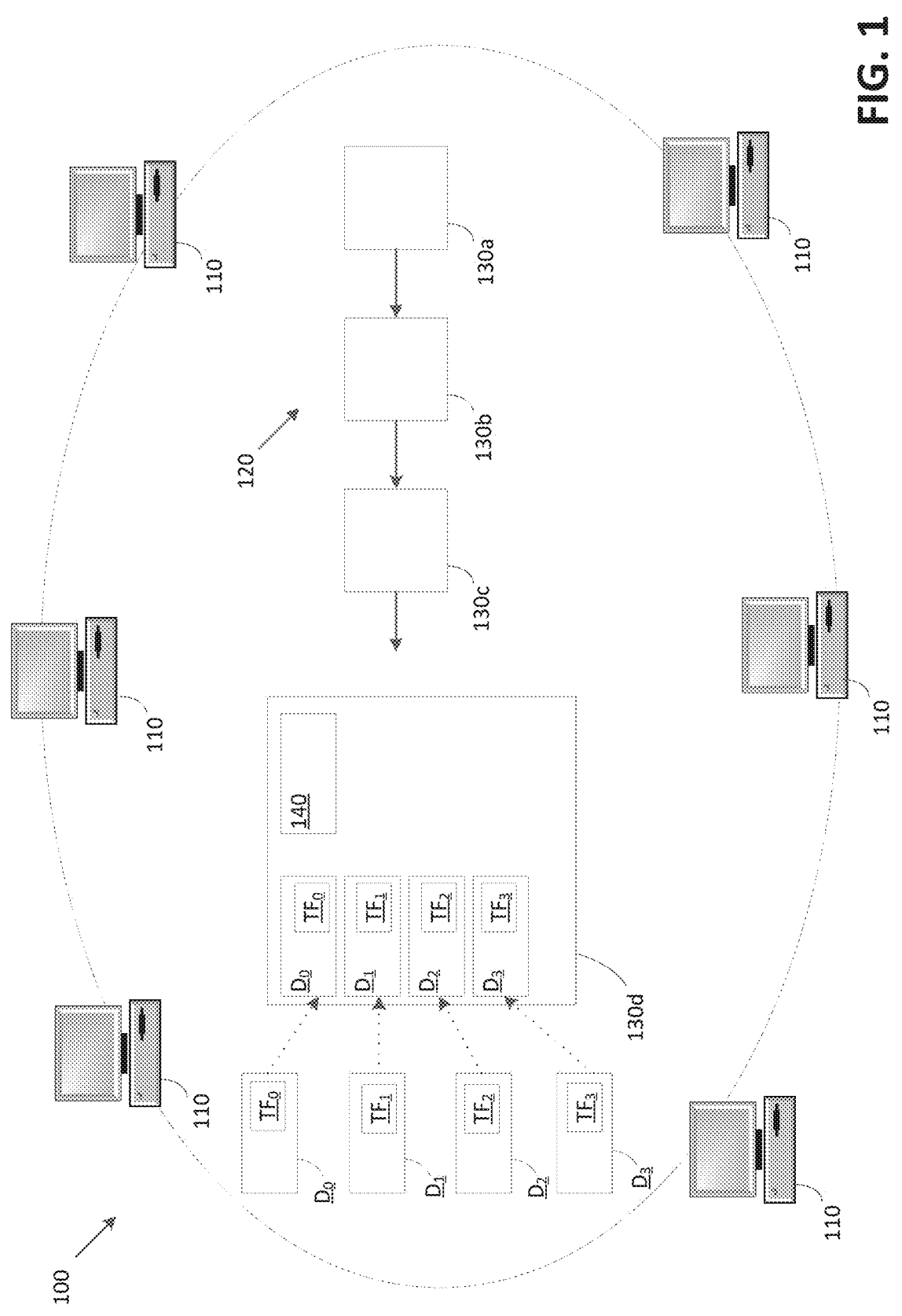
FIG. 1 is a block diagram of an example distributed system architecture.

Systems and methods are described for managing digital rights. A rights holder may comprise an entity or a device associated with the management of digital rights, for example, the grant and denial of access to certain digital media (e.g., content assets). The rights holder may be associated with one or more content assets. For example, the rights holder may comprise or be associated with a content distributor, a content owner, a content creator, or a manger of digital rights associated with one or more content assets.

The rights holder may manage the encryption, storage, and/or distribution of the one or more content assets. Encrypted content assets may be made available to one or more users or user devices. However, access control associated with playback of the content assets may be managed by distribution of an encryption key or keys configured to encrypt/decrypt the content assets. As an example, encrypted content assets may be freely accessible to users/user devices, but playback of the content assets may be dependent on possession of the encrypted content asset and the encryption key.

To facilitate management of the key distribution, the key(s) may be stored in a distributed database, such as in a transaction of a distributed ledger or a blockchain. The key(s) using the distributed database may allow the rights holder flexibility in managing access to the content assets. The distribution of key(s) using the distributed database may allow the rights holder more discrete control over managing rights to the content assets and for specific users/user accounts.

Transactions in the distributed database may comprise an identifier. The identifier may be associated with the rights holder and/or a particular content asset. The identifier may be used to differentiate one transaction from another, for example, to delineate which key a particular user may need in order to decrypt a particular content asset. As such, the rights holder or other entity may make the identifier available to one or more users. Such a distribution of the identifier may be made selectively to a particular user or group of users. Using the received identifier, a user may monitor the distributed database for the transaction associated with the identifier. The user may obtain information associated with the transaction such as, for example, the key from the transaction. The user may decrypt the encrypted content asset using the decryption key to facilitate playback and/or further processing.

Additionally or alternatively, transactions in the distributed database may comprise a mechanism for inserting and storing metadata in the distributed database. A transaction may comprise a spendable output, such as a unit of digital currency. The transaction may comprise a fee value, such as a transaction fee. The fee value may increase the likelihood that the transaction will be stored or accepted in the distributed database. The fee value may comprise an incentive for nodes associated with the distributed database to validate or accept the transaction. However, the transaction may not comprise a fee value. The transaction may be configured to remain in a memory pool of the distributed database. The transaction may comprise a fee value such that the transaction is relayed by nodes, but is not validated by the nodes that are configured to generate the distributed database. For example, the nodes may pass the transaction over in favor of transactions comprising higher fee values. Accordingly, the fee value may be modified to provide temporal control over the processing time of a given transaction, which may comprise a particular encryption key. As such, a rights holder in need of an urgent key distribution to facilities decryption and playback of certain content may adjust the transaction fee value to encourage expedited processing of the transaction, such as the addition of the transaction as a block in the blockchain. Alternatively, a low fee value transaction may be processed on a standard timeline.

Timing of access to a content asset may be managed by generating and/or transmitting (e.g., broadcasting) the transaction comprising the decryption key at a select time or date. Additionally or alternatively, the rights holder or other entity may manage timing of access to a content asset by generating a transaction comprising a time lock function. The time lock function may comprise computer readable code in the transaction that may indicate a release time. As such, the distributed database may prevent the transmission (e.g., broadcast), validation, or execution of the transaction until the indicated release time or within a prescribed time period.

The extent of access to the content asset may be further controlled by selectively encrypting all of the content asset or part of the content asset. Different parts or segments of the content asset may be encrypted with different keys. As such, the rights holder may manage the extent of access to the content asset by distributing a decryption key configured to decrypt a select part of the content asset. By using multiple or rotating keys, the access to content may be more discretely controlled and may be scaled across multiple users having access to the distributed database.

Referring to FIG. 1, the distributed system may comprise a network 100 of nodes 110. Each of the nodes 110 may be or comprise, for example, one or more of a computing device, a central processing unit, a graphical processing unit, a field programmable gate array, or an application specific integrated circuit.

The network 100 of the nodes 110 may be or comprise a distributed database. The distributed database may be decentralized, wherein the database may not have a central administrator or centralized storage. The nodes 110 in the network 100 may store a copy of a collection of data, such as a distributed ledger. The distributed ledger may comprise recorded entries, such as transactions. The data may be replicated, shared, or synchronized across the nodes 110. The distributed database may be continually reconciled, such as to reflect changes to the collection of data. The nodes 110 may continually or periodically access and store the most recent version of the collection of data. Responsive to joining the network 100, the node 110 may store a copy of the collection of data, such as by automatically downloading the collection of data.

The distributed database (e.g., distributed ledger), may be or comprise a blockchain 120. The blockchain 120 may comprise one or more blocks 130 in which data is recorded. The blocks 130 in the blockchain 120 may function as a mechanism to organize the data in the chain 120. For example, the blocks 130 may be linked in a sequence determined by a relationship of the data in the blocks 130, such as the chronology in which the data is recorded or validated. The blocks 130 may be linked to deter retroactive modification of data in the blockchain 120, such as through inter-block dependencies.

The nodes 110 may build or modify the chain 120, such as by adding the blocks 130 to the blockchain 120. The nodes 110 may perform several operations to build the blockchain 120. For example, responsive to receiving new data $D_0$, $D^1$, $D^2$, $D^3$ from the network 100, the nodes 110 may validate the new data $D_0$, $D_1$, $D_2$, $D_3$. As an example, if the new data $D_0$, $D_1$, $D_2$, $D_3$ comprises transactions, the nodes 110 may authenticate the identity of the parties to the transaction. Authenticating the identity of one or more of the parties may comprise determining that a party is who they purport to be. As an example, a party may identify themselves by signing the transaction with a digital signature. The digital signature may comprise an encryption of at least a portion of the contents of the transaction or the new data $D_0$, $D_1$, $D_2$, $D_3$ with a private key of the party. The private key may comprise a string of numbers. The private key may only be known to the party, accessible to the party, or possessed by the party. The digital signature may comprise a hash of the private key of the party and at least a portion of the transaction or the new data $D_0$, $D_1$, $D_2$, $D_3$, such as with a cryptographic hash function. Examples of hash functions include MD4, MD5, SHA-1, SHA-256, SHA-512, and SHA-3. The digital signature may be validated by the nodes 110, such as by decrypting the digital signature with a public key. The public key may comprise a string of numbers. The public key may be used to decrypt data that has been encrypted with the private key. The transaction may comprise the public key. As such, the nodes may obtain or determine the public key from the transaction. The nodes 110 may confirm that the party is associated with the public key by confirming that the party has the private key corresponding to the public key. The nodes 110 may confirm that the party has the private key by decrypting the portion of the transaction that was encrypted using the private key, such as using the public key. The digital signature may allow for verification of the transaction while maintaining the anonymity of the parties to the transaction.

As another example, the nodes 110 may validate that a party to a transaction was in possession of consideration that may be the subject of the transaction. Consideration may comprise units of a digital currency. The digital currency may comprise a digital asset or medium of exchange. The digital currency may comprise a cryptocurrency, such as a digital currency transacted and generated using cryptography. Transaction data may comprise a transaction amount, such as a transfer amount, a remainder amount, or a transaction fee $TF_0$, $TF_1$, $TF_2$, $TF_3$. The nodes 110 may validate that the party is in possession of the units that they are attempting to transfer, such as to prevent double-spending of units of a digital currency. The nodes 110 may review transactions recorded in existing blocks 130a, 130b, 130c of the blockchain 120 to validate that the party did not transfer the units in a previously recorded transaction. For example, the data Do may comprise a transaction in which a party X is transferring a coin to a party Y. To validate that the party X is in possession of the coin, the nodes 110 may review the transactions recorded in one of the existing blocks 130a, 130b, 130c. If the nodes 110 find that the party X transferred the coin to a party Z in a transaction recorded in block 130b, the nodes 110 may not validate Do.

The nodes 110 may collate the new data $D_0$, $D_1$, $D_2$, $D_3$ into a new block 130d. The nodes 110 may perform an operation to add the new block 130d to the blockchain 120. The operation to add the new block 130d may depend on the relationship of the data in the blocks 130. For example, if the data in the blocks 130 is related chronologically, such as where the first block 130a in the chain records older data than the data of subsequent blocks 130b, 130c, the nodes 110 may perform a timestamp function to log the sequence in which blocks 130 are added to the blockchain 120.

The operation to add the new block 130d to the blockchain 120 may comprise appending information of the prior block 130c in the chain 120. For example, the output of a function performed for the prior block 130c may comprise an input of the function performed for the new block 130d. An iterative function may link the new block 130d to the prior block 130c in the blockchain 120. The iterative function may also deter retroactive modification of data in the block 130 as the modification may require new functions to be performed for the subsequent blocks 130 in the blockchain 120.

The nodes 110 may be incentivized to perform the operation to add the new block 130d to the blockchain 120. For example, the block 130d may be assigned a value 140, such as a coin or unit of digital currency that will be transferred to one or more nodes 110 that perform part of all of the operation. The value 140 may depend on the difficulty of performing the operation for the block 130d. Also, if the data $D_0$, $D_1$, $D_2$, $D_3$ recorded in the block 130d comprises transactions, a transaction may assign a transaction fee $TF_0$, $TF_1$, $TF_2$, $TF_3$ which may be transferred to one or more nodes 110 that perform the operation on the block 130d in which the transaction is recorded. If an incentive is provided for nodes 110 to perform the operation to add the new block 130d to the chain 120, performance of the operation may be referred to as mining.

The nodes 110 may individually perform an operation to build the blockchain 120. The nodes 110 may lend or combine their processing power, such as in a pool, to perform an operation to build the blockchain 120. If the nodes 110 work in tandem, incentives, such as the value 140, may be divided amongst the nodes 110. For example, incentives may be divided proportionally to contribution of the nodes 110 to the work.

Once the operation is performed to add the new block 130d to the chain 120, the nodes 110 may communicate the new block 130d to the network 100. The nodes 110 may express their acceptance of the new block 130d to the blockchain 120 by working off the block 130d in performing the operation to add a subsequent block to the blockchain 120. If more than one version of the blockchain 120 exists, the nodes 110 may attempt to work off the longest blockchain 120. The longest blockchain 120 may be determined by an algorithm for scoring the blockchain 120. For example, a blockchain 120 may be assigned a score based on the computational work required to generate the blockchain 120. The node 110 may determine the longest blockchain 120 by comparing the score or the computational work that was required to generate the blockchain 120

The network 100 may have self-correcting mechanisms, such as to address discrepancies between nodes 110 in the network 100. For example, if there is a fork in the blockchain 120, the node 110 working off one branch of the blockchain 120 may switch to a second branch of the block chain 120 if the second branch becomes longer than the first branch. As another example, if the node 110 does not receive the block 130, the node 110 may request the block 130 in response to receiving the next block 130 and determining that it did not receive the previous block 130.

One or more nodes 110 in the network 100 may not participate in building the blockchain 120. The operations that the nodes 110 in the network 100 may perform relating to the blockchain 120 may not be limited to building the blockchain 120. As an example, one or more nodes 110 may monitor the blockchain 120 for particular transactions. For example, the nodes 110 may monitor the blockchain 120 for transactions that comprise a specific identifier. The nodes 110 may monitor the blockchain 120 for transactions that comprise a particular input or output. The input and the output of a transaction may comprise fields. The output may comprise a field for instructions for the transaction. For example, the output may comprise a field for an address of a party to the transaction and a spending amount of the transaction. The output may comprise arbitrary data, such as information or metadata to be stored or broadcast on the blockchain 120. The input may comprise a reference to an output from a previous transaction. For example, the input may comprise a field for a spending value of the previous transaction, a hash of the previous transaction, a public key, a digital signature, and addresses of parties to the previous transaction. The nodes 110 may monitor the blockchain 120 for transactions that comprise particular metadata, such as in the output of the transactions. The nodes 110 may monitor the blockchain 120 for transactions that comprise nonpayment data, such as a message.

Figure 2:
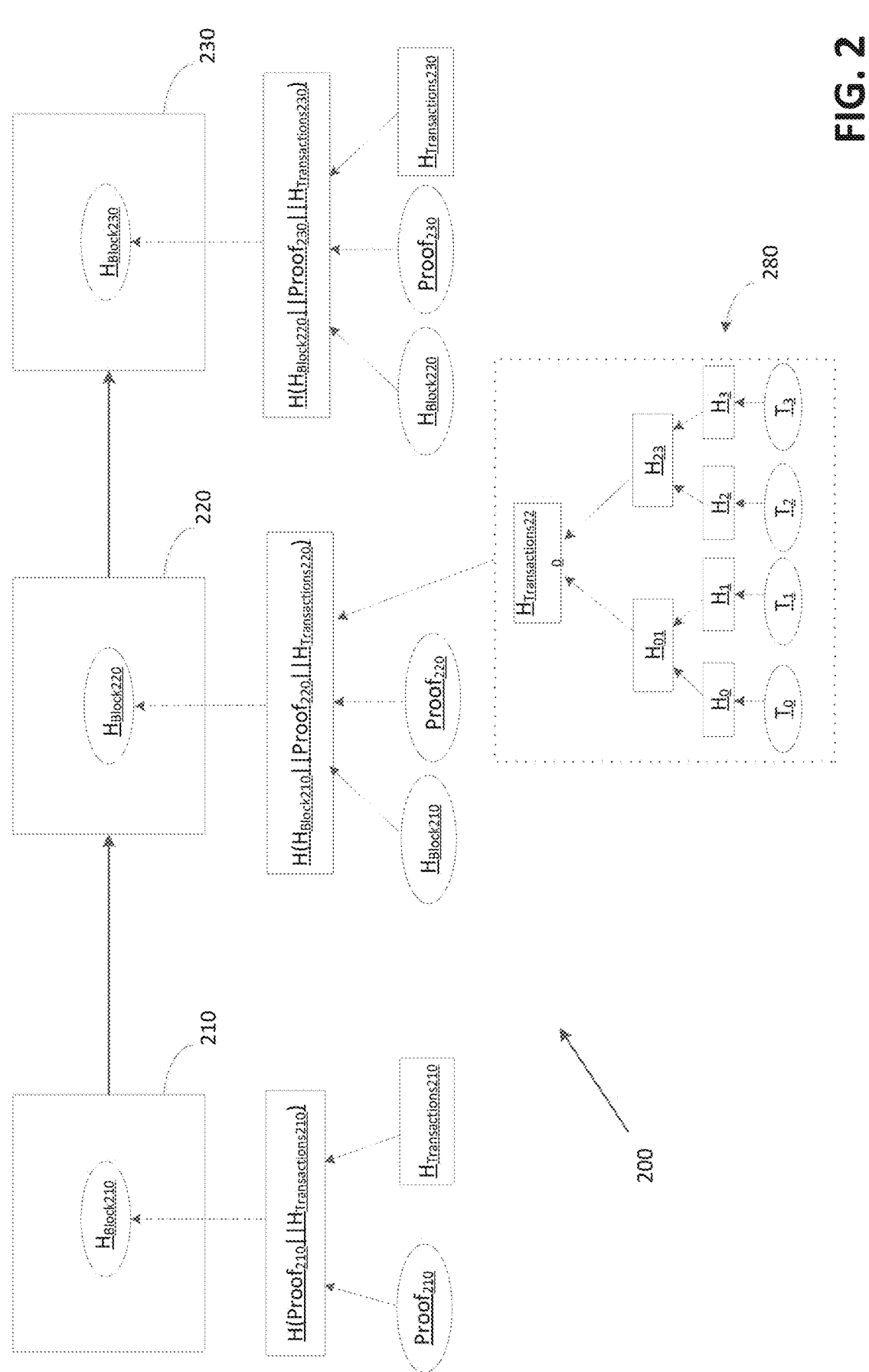
FIG. 2 is a block diagram of an example distributed ledger architecture.

Referring to FIG. 2, a distributed ledger may comprise a blockchain 200 in which transactions are recorded in blocks 210, 220, 230. The blocks 210, 220, 230 may be linked in a sequence that represents the chronology of the execution, validation, or recording of the transactions. For example, the blockchain 200 may comprise a genesis block 210 that records the earliest transactions in the blockchain 200 and comprises the first block 210 in the blockchain 200. The blocks 220, 230 following the genesis block 210 may record transactions that were executed or validated subsequent to the transactions of the preceding block 210, 220, 230 in the blockchain 200. The blocks 210, 220, 230 may record transactions that occurred prior to the transactions of the subsequent block 220, 230 in the blockchain 200. As an example, the block 230 may record transactions that occurred after the transactions recorded in the block 220. New transactions may be recorded in a new block. The new block may be appended to the last block 230 in the blockchain 200. Although the example blockchain 200 is depicted as comprising three blocks 210, 220, 230, the chain may comprise less than three blocks or more than three blocks.

The blocks 210, 220, 230 may record transactions as hashes of the transactions. The hashes of the transactions may comprise the output of chained hash functions of the transactions. For example, transactions may be chain hashed in a Merkle Tree 280. As an example, the transactions $T_0$, $T_1$, $T_2$, $T_3$ of the block 220 may individually be hashed with a hash function to yield hashes $H_0$, $H_1$, $H_2$, and $H_3$, respectively. The hashes $H_0$, $H_1$, $H_2$, and $H_3$ of the transactions may be combined, such as by concatenating $H_0$ with $H_1$ and $H_2$ with $H_3$. The combined hashes may be hashed to yield hashes $H_{01}$ and $H_{23}$, which may be combined and hashed to produce a single hash ($H_{Transactions220}$). Although the block 220 is depicted as recording four transactions $T_0$, $T_1$, $T_2$, $T_3$, the block 220 may record a different number of transactions. The transactions of the blocks 210 and 230 ($H_{Transactions210}$, $HT_{ransactions230}$) may be recorded as hashes. The hashes of the transactions ($H_{Transactions210}$, $HT_{ransactions230}$) in blocks 210 and 230 may comprise the output of chained hash functions of the transactions recorded in blocks 210 and 230, such as with a Merkle Tree 280.

The blocks 210, 220, 230 may function as a mechanism to implement a timestamp system to generate computational proof of the chronological order of the transactions in the blockchain 200. A timestamp of a block 210, 220, 230 may comprise a hash of the transactions in the block 210, 220, 230 and the transactions of the previous block 210, 220, 230 in the blockchain 200. The timestamp may be recorded, such as by publishing. To eliminate the requirement to publish the timestamp, a protocol may be implemented to achieve distributed chronological consensus, such as a proof protocol. A proof protocol may comprise a proof-of-work protocol, a proof-of-stake protocol, a proof-of-existence protocol, or another proof protocol.

A proof-of-work protocol may comprise scanning for a proof ($Proof_{210}$, $Proof_{220}$, $Proof_{230}$), such as a string or value, that when cryptographically hashed with the hash of the transactions of a block ($H_{Transactions}$) and the hash of the transactions of the previous block 210, 220, 230 yields a hash ($H_{Block}$) with a pre-determined number of leading zero bits. For example, a proof ($Proof_{210}$, $Proof_{220}$, $Proof_{230}$) may be identified such that the hash ($H_{Block}$) has 60 leading bits that are zero.

As an example, the proof-of-work for the block 220 may comprise scanning for a proof ($Proof_{220}$) that hashed with the transactions $T_0$, $T_1$, $T_2$, $T_3$ of the block 220 and the hash ($H_{Block210}$) of the previous block 210 yields an output ($H_{Block120}$) that has a pre-determined number of leading zero bits. The proof-of-work may be solved for a hash function in which the hash of the transactions ($H_{Transactions}$) is an input of the hash function, such as the hash of the transactions $T_0$, $T_1$, $T_2$, $T_3$ in the Merkle Tree 280. The next block 230 in the blockchain 200 may be appended to the blockchain 200 based on a performed proof-of-work to indicate the proof ($Proof_{230}$) which, hashed with the transactions of the block 230 (or hash of the transactions $HT_{ransactions230}$) and the hash of the block 220 ($H_{Block220}$), yields an output ($H_{Block230}$) with a pre-determined number of leading zero bits. Once the proof ($Proof_{230}$) is identified, the block 230 may be broadcast through the network. If the block 230 is accepted, the nodes may work on generating the next block in the chain 200 using the hash ($H_{Block230}$) of the accepted block 230.

An iterative proof-of-work protocol may deter modification of a block in the blockchain 200 as it may require re-doing the proof-of-work for the proceeding blocks in the blockchain 200. For example, modification of a transaction in the block 210 may require performance of a new proofof-work for the block 210, yielding a new hash ($H_{Block210}$) for the block 210. Consequently, a new proof-of-work may be required for the block 220 using the new hash ($H_{Block210}$) for the block 210, yielding a new hash ($H_{block220}$) for the block 220. The subsequent blocks in the chain 200 may require a new proof-of-work.

A transaction in the blockchain may comprise data unrelated to digital currency exchange, such as metadata or a message. The blockchain may serve as an efficient means of distributing the data. The blockchain may serve as a reliable means of distributing the data, as modification of data recorded in a block may be difficult. The data may afford security in the blockchain, as nodes may not identify the data or recognize the purpose of the data. Alternatively or additionally, the transaction may be generated comprising data that is not recorded in a blockchain and remains in a memory pool. The transaction may eventually be removed from the memory pool. For example, the insertion of the data may result in the transaction being invalidated and not added to a block.

As an example of use of blockchain to distribute data unrelated to digital currency exchange, a transaction may be generated comprising a key to decrypt content. Although the transaction may be viewed by any node in a network, the nodes may not be able to identify the transaction that comprises the key. For example, the nodes may not recognize the significance of the key. A rights holder may control access to the key by selectively making an identifier available to parties, wherein the identifier may be associated with the transaction comprising the key. If the transaction comprises an encrypted key, the rights holder may control access to the key by selectively distributing decryption information associated with the key to authorized parties.

Figure 3:
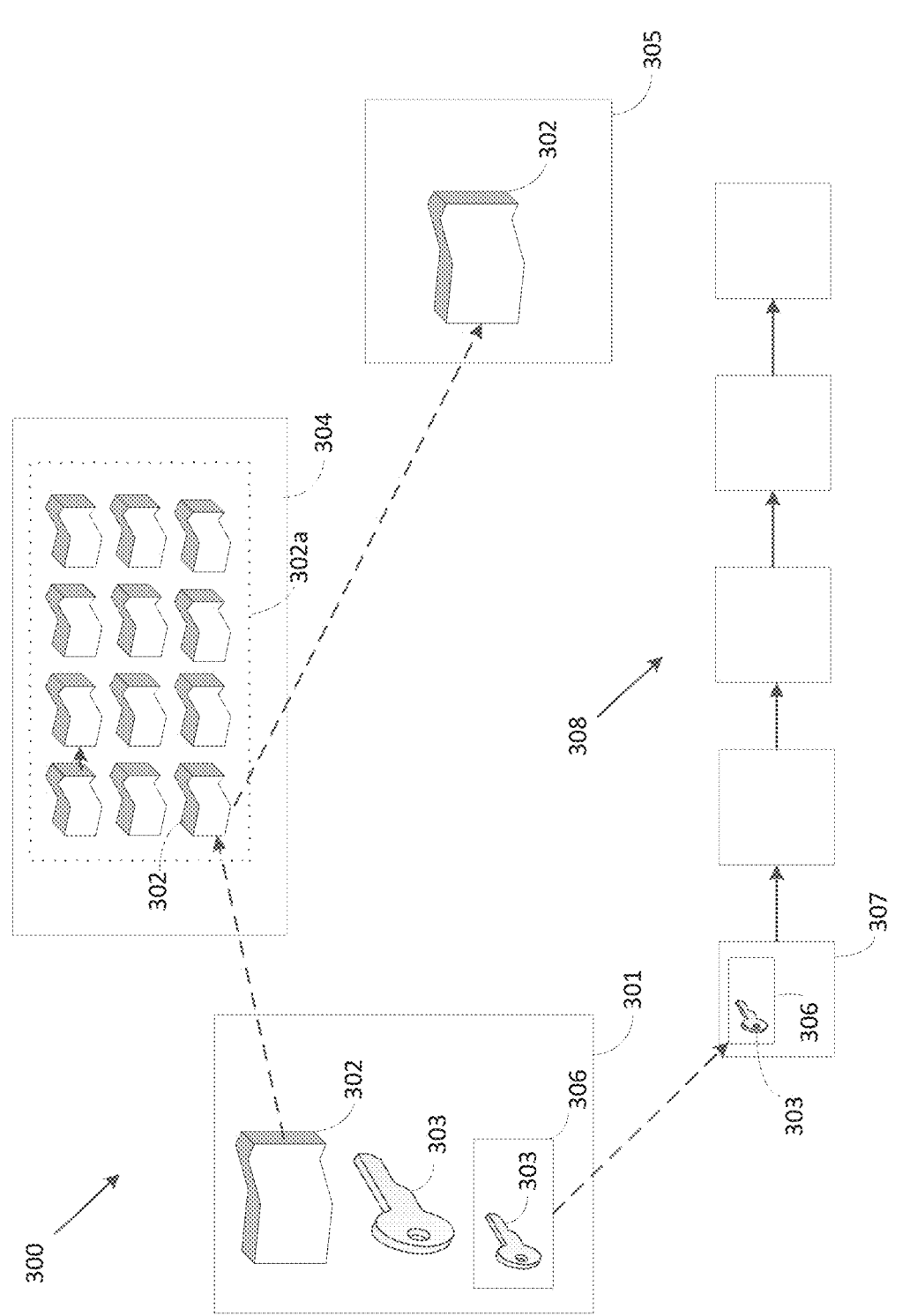
FIG. 3 is a block diagram of an example system architecture.

Referring to FIG. 3, a system 300 may comprise a digital rights holder 301. The rights holder 301 may comprise a person, a device, a network of devices, or an entity. The rights holder 301 may possess rights to content and may control the allocation and revocation of such rights. The rights holder 301 may be tasked with managing content or access to content by a source of the content or may be or comprise the content source. The rights holder 301 may be configured to make content available to consumers. The rights holder 301 may comprise a television network. The rights holder 301 may comprise an entertainment-on-demand service. The rights holder 301 may comprise a creator of content, such as a movie studio, a recording artist, or a software designer. The rights holder 301 may comprise a server or a computing device. The rights holder 301 may comprise a register or a node, such as one of the nodes 110 in FIG. 1, in a distributed system or network, such as the network 100 in FIG. 1.

The rights holder 301 may manage a content asset. The content asset may comprise data or content, including but not limited to a video file, an image, an audio recording, or a software program. The content asset may comprise an encrypted content asset 302, for example, content encrypted using an encryption algorithm. The rights holder 301 may have access to a key 303, such as a decryption key configured to decrypt the encrypted content asset 302. The key 303 may be a symmetric-key, such as a key configured to perform decryption and encryption. The key 303 may be one of an asymmetric key pair, such as a private key and a public key.

The rights holder 301 may store the encrypted content asset 302 at a server 304. The server 304 may comprise a database server, a hosting server, a content delivery network, or a distribution server. The server 304 may comprise a distributed server, such as a peer-to-peer content delivery network. The server 304 may host or store the encrypted content asset 302. The server 304 may host or store a plurality of encrypted content assets 302a.

A user device 305 may access the encrypted content asset 302 at the server 304. The user device 305 may comprise a device associated with a user, a consumer, or a customer, such as a customer of the rights holder 301. The user device 305 may comprise a client device. The user device 305 may comprise a computing device such as a personal computer, a mobile phone, a media player, or a streaming device. The user device 305 may comprise a program on a computing device, such as a media player program or a digital asset manager. The user device 305 may comprise a node, such as one of the nodes 110 in FIG. 1, in a distributed system, such as the network 100 in FIG. 1.

The rights holder 301 may store the decryption key 303 in a distributed system. For example, the rights holder 301 may record the decryption key 303 in a distributed database, for example in a transaction 306 on a blockchain 308. As an example, the rights holder 301 may generate the transaction 306 comprising the decryption key 303. An output address of the transaction 306 may comprise the decryption key 303. The address may comprise a string of characters, such as alphanumeric characters. The address may be associated with a party to the transaction 306. For example, each party that transacts on the blockchain 308 may be associated with an address that is unique to that party. The address may comprise a public receiving address or change address. The address may comprise a wallet address. A wallet may comprise a structured file or a database. The wallet may store a private key of the party.

The output of the transaction 306 may comprise a plurality of addresses, wherein one of the plurality of addresses comprises the decryption key 303. The decryption key 303 may comprise a public key associated with the transaction 306. The decryption key 303 may be or comprise a public key associated with a party to the transaction 306. For example, the rights holder 301 may generate the transaction 306 and enter a public key associated with the rights holder 301 in the input of the transaction 306. The public key of the rights holder 301 may be or comprise the decryption key 303. The public key may remain private until the transaction 306 is validated or executed.

The transaction 306 may comprise an identifier. The identifier may be associated with the rights holder 301 or the encrypted content asset 302. The identifier may comprise the input or output address of the transaction 306. The rights holder 301 may broadcast the transaction 306 over a network associated with the blockchain 308, such as the blockchain 120 in FIG. 1 or the blockchain 200 in FIG. 2. The rights holder 301 may broadcast the transaction 306 via a node in the network, such as one of the nodes 110 in FIG. 1.

The transaction 306 may be recorded in a block 307. The transaction 306 may be recorded in the block 307 in the form of a hash function of the transaction 306 or a chained hash function of the transaction 306 and the other transactions recorded in the block 307. The block 307 may be similar to the block 130 in FIG. 1 or any one of the blocks 210, 220, 230 in FIG. 2. The block 307 may be added to the blockchain 308, such as with a proof-of-work protocol.

The user device 305 may monitor the blockchain 308 for the transaction 306. For example, the user device 305 may scan the transactions recorded in the blockchain 308 for any transaction that comprises the identifier. The user device 305 may identify the transaction 306 using the identifier. The user device 305 may obtain the key 303 from the transaction 306 and may use the key 303 to decrypt the encrypted content asset 302 to playback the content asset.

As an example, a rights holder may allow a third party to control the release of a content asset. The rights holder may generate a transaction with the address of the third party in the output of the transaction. The address of the third party may comprise a string of characters, such as alphanumeric characters. Each party that transactions on the blockchain 308 be associated with an address that is unique to that party. The address may comprise a public receiving address or change address. The address may be associated with a wallet. A wallet may comprise a structured file or a database. The wallet may store a private key of a party, such as the third party.

The transaction may transfer value to the third party. The rights holder may have a public key. The public key may comprise a decryption key associated with the content asset. The rights holder may enter the public key in the input of the transaction. The transaction may be configured such that the public key remains private until the transaction is validated or executed. The third party may sign or execute the transaction, such as to redeem the value. Responsive to the third party signing or executing the transaction, the public key may become visible and the decryption key may effectively be released. The third party may determine not to release the decryption key by not signing or executing the transaction, but, as a result, the third party may not receive the value of the transaction.

The transaction may comprise an output with multiple addresses associated with a plurality of third parties. The transaction may require the signature of the plurality of third parties to be executed or validated. Thus, the plurality of third parties may be required to coordinate signing the transaction and releasing the decryption key.

A rights holder may implement one of several key distribution models. According to one model, the rights holder may trust one or more users, but the rights holder may wish to restrict the users' access to a content asset. The rights holder may transmit the encrypted content asset to the users in advance of the authorized access. Based on determining to allow users to access the content asset, the rights holder may distribute the decryption key. The rights holder may distribute a general decryption key that all of the users may use to decrypt the encrypted content asset. The rights holder may distribute multiple general decryption keys. The multiple general decryption keys may be used by all of the users and different general decryption keys may be configured to decrypt a different part of the encrypted content asset. The part of the content asset may comprise, for example, the first minute of the content asset, the second third of the content asset, or the fifth episode of the content asset.

According to another key distribution model, the rights holder may be tasked with managing content access for a plurality of groups of users. Users may be grouped, for example, by geographic region, content purchase type, age group, or subscription type. The rights holder may distribute a plurality of decryption keys. The rights holder may distribute tens, hundreds, or thousands of decryption keys, for example. Different decryption keys may be associated with different groups of users. The rights holder may distribute batches of keys for different groups at different times. A batch may comprise one or more different keys that are associated with different groups. A batch may comprise one or more different keys that are configured to decrypt different parts of the encrypted content asset.

According to another key distribution model, the rights holder may engage in a direct-to-user exchange. The rights holder may trust the user. For example, the rights holder may trust the user based on a financial or legal agreement in place between the rights holder and the user. The rights holder may trust the user based on the identity of the user. The rights holder may trust the user based on an external trust-establishing mechanism, such as with transactions on the distributed database which may be validated and may authenticate the identities of the rights holder and the user. The rights holder may transmit a decryption key to the user directly. The decryption key may be unique to the user. The decryption key may be unique to the encrypted content asset. The rights holder may transmit the decryption key to the user via the distributed database. The user may pay the rights holder for the decryption key by generating a transaction for the distributed database. The user may pay the rights holder using a series of adjustable amount transactions for the distributed database, as will be described in this disclosure. Other models may be used.

In one or more of the described models, or other models, the key may be encrypted with a global key. The key may be unique to a user or a group of users. The rights holder may distribute one or more unique keys in advance of releasing the content asset for access. Based on determining to release or allow users to access the content asset, the rights holder may distribute the global key. Distributing the global key may comprise distributing the global key using the distributed database. Distributing the global key may comprise distributing the key directly to one or more users.

Figure 4:
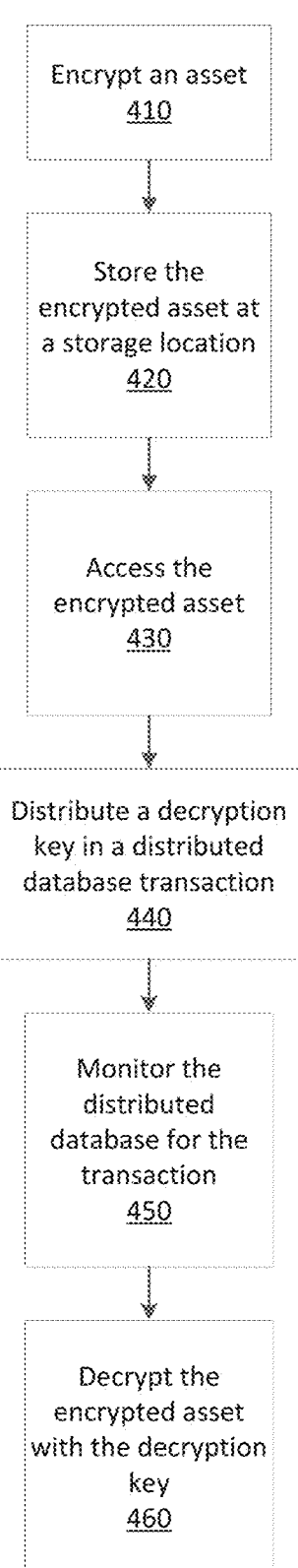
FIG. 4 is a flow diagram of an example method.

Referring to FIG. 4, a content asset may be encrypted, at step 410. The content asset may comprise data or content, including but not limited to a game, an image, or literature. The content asset may be encrypted using an encryption algorithm. The entire content asset may be encrypted. The entire content asset may be encrypted with one encryption key. Different parts or segments of the content asset may be encrypted, such as with different encryption keys. Part of the content asset may be encrypted and part of the asset may not be encrypted. Sub-parts of the encrypted part of the content asset may be encrypted with different encryption keys. For example, if the content asset comprises a video file, all of the content asset may be decrypted with the exception of select frames of the video. The encrypted content asset may be digitally signed. For example, the encrypted content asset may be digitally signed with a key to enable verification that the encrypted content asset came from a source, such as a rights holder.

At step 420, the encrypted content asset may be stored. The encrypted content asset may be stored at a storage location that may be accessible by one or more user devices. For example, the encrypted content asset may be stored at one or more servers. Different parts of the encrypted content asset may be uploaded to different servers.

The server may comprise a database server, a hosting server, a content delivery network, or a distribution server. The server may comprise a distributed server, such as a peer-to-peer content delivery network. The server may host or store the encrypted content asset. The server may host or store a plurality of encrypted content assets. The server may host or store the encrypted content asset and other content, such as non-encrypted content assets or assets associated one or more entities different than the rights holder of the encrypted content asset. The server may distribute the encrypted content asset to one or more caches. A cache may comprise hardware or software configured to store data. The cache may be external to the server.

At step 430, the encrypted content asset may be accessed or received. The encrypted content asset may be accessed or received by a user. The user may be or comprise a user device, such as the user device 305 of FIG. 3. The user may be or comprise a customer and may access the encrypted content asset using the user device.

The encrypted content asset may be accessed or received from the one or more servers. Different parts of the encrypted content asset may be accessed or received from different servers. A plurality of users may access or receive the encrypted content asset from the one or more servers. The encrypted content asset may be downloaded. The encrypted content asset may be stored, for example, at a computing device, a memory drive, or a local cache.

The encrypted content asset may be pre-positioned, such as by storing the encrypted content asset on a storage unit in advance of receiving authorization to access the encrypted content asset. The user device may be configured to indicate the existence of the content asset, such as by causing a title or preview of the content asset to render. The user device may be configured to indicate that the content asset may be available for purchase. However, the user device may not be able to access the content asset from the encrypted content asset. For example, the user device may not be able to render or run the encrypted content asset.

As an example, if the user, such as an entertainment services subscriber, downloads one or more encrypted content assets comprising encrypted video files, the user may be able to view the titles of the videos, such as via a menu screen. The user may be able to view or play parts of the video files that are not encrypted, such as cover images or trailers. The user may select a menu option comprising a video file. However, the user may not be able to watch the video.

At step 440, a key configured to decrypt the encrypted content asset may be distributed. The decryption key may be unique to the user. The decryption key may be unique to the encrypted content asset. The decryption key may be generic or global, for example, associated with more than one encrypted content asset or associated with more than one user.

The decryption key may be distributed across a network. More than one decryption key for the encrypted content asset may be distributed across the network. For example, different keys configured to decrypt different parts of the encrypted content asset may be distributed. Different keys associated with different versions of the content asset may be distributed. Different keys associated with different groups of users may be distributed. For example, the rights holder may distribute one decryption key for users that paid for an extended cut version of a movie. The rights holder may distribute a different decryption key for users that paid for a theater version of the movie.

The decryption key may be distributed by storing the decryption key in a distributed database, such as a distributed ledger or a blockchain. The decryption key may be stored in the distributed database by generating a distributed ledger entry, such as a transaction, comprising the decryption key. An output of the transaction may comprise the decryption key. For example, an address in the output of the transaction may comprise the decryption key. The input of the transaction may comprise the decryption key. For example, a public key in the input of the transaction may comprise the decryption key. The key may be introduced in the transaction using a mechanism for inserting metadata into the distributed database, such as an operation code. For example, the OP_RETURN operation code from the Bitcoin Script language, which may allow arbitrary data to be added to the transaction, may be used to introduce the key in the output of the transaction. The transaction may comprise an encrypted version of the decryption key. The transaction may comprise the decryption key within another key, such as a key associated with a digital signature of the transaction or a key used to encrypt data of the transaction.

The decryption key may be distributed by generating more than one distributed ledger entry. For example, a pair of transactions may be generated. One of the pair of transactions may comprise the decryption key. The other of the pair of transactions may comprise a key or identifier that may be used to identify or decrypt the transaction comprising the decryption key.

The key may be distributed by generating multiple transactions. A first transaction associated with the identifier and comprising a spendable output may be generated. A second transaction may be generated. The second transaction may be associated with the identifier and may comprise metadata, such as a private key, which may allow the first transaction to be spent. The private key may comprise the decryption key. The units of the first transaction may be spent in subsequent transactions. The subsequent transactions may comprise the identifier and the private key. The subsequent transactions may comprise a chain of records of the decryption key.

The transaction may comprise an incentive for one or more nodes in the network associated with the distributed database to validate or accept the transaction. The incentive may increase the likelihood that one or more nodes may record the transaction in the next block of the blockchain. The incentive may correspond to a transaction priority assigned to the transaction, such as a numerical value calculated at least based on the incentive. The incentive may increase the likelihood that one or more nodes may mine or perform a proof on a block comprising the transaction, such as to add the block to the blockchain. The incentive may comprise a transaction fee associated with the transaction, such as a unit of digital currency. The transaction may be transmitted (e.g., broadcast). The transaction may be validated and accepted in a block. The block may be added to the blockchain.

The transaction may not comprise an incentive for one or more nodes to validate or accept the transaction. The transaction may comprise an incentive with a value that does not increase the likelihood that one or more nodes may validate or accept the transaction. The transaction may remain in a memory pool of the distributed database. The transaction may eventually be removed from the memory pool. The transaction may be configured to remain un-validated or unaccepted by the one or more nodes. For example, the transaction may be configured to remain in the memory pool. The transaction may be configured to be available on the distributed database for a limited time. For example, the transaction may be configured to remain the memory pool for a period of time and be pruned from the memory pool.

The transaction identifier may be made available to one or more users. For example, the identifier may be made available to one or more users in exchange for payment. The identifier may be made available to a user based on a subscription associated with the user. A plurality of identifiers associated with different transactions or different decryption keys may be made available. Different identifiers may be made available to different users.

As an example, the rights holder may be a provider of digital entertainment. The rights holder may offer content that may be viewable for a fee. The user may comprise a customer of the rights holder. The user may browse the rights holder's offerings of content, such as via a media player. The user may select a content, such as a movie, and may make a payment to the rights holder. After confirming the payment, the rights holder may transmit an identifier associated with the movie to the user.

At step 450, the distributed database may be monitored for the transaction comprising the key. The user may monitor the distributed database for the transaction comprising the key. For example, if the distributed database comprises a blockchain, the transactions in the blockchain may be scanned for the transaction comprising the decryption key. The distributed database may be searched using the identifier of the transaction. The location of the transaction in the distributed ledger may be determined using the identifier. The decryption key may be obtained from the transaction.

At step 460, using the decryption key, the encrypted content asset may be decrypted. The decryption key may be configured to decrypt all of the encrypted content asset or part of the encrypted content asset. For example, if the encrypted content asset is a video file, the decryption key may be configured to decrypt a segment of the file that corresponds to the first five minutes of the video. The decrypted content asset may be accessed. The decrypted content asset may be processed, run, copied, or rendered. The decrypted content asset may be sent to another device, which may process, run, copy, or render the decrypted content asset. The device may download the decrypted content asset. As an example, if the content asset comprises a video game file, the user device may decrypt the encrypted content asset and a gaming console may download the video game file from the user device. The video game may be played on the gaming console.

Access to a content asset may be controlled by selectively distributing the encrypted content asset or a decryption key. For example, the rights holder may selectively distribute the identifier to one or more authorized users, such as users associated with a payment or a subscription. Even though an unauthorized user may access the encrypted content asset from the server, the rights holder may prevent the unauthorized user from decrypting and accessing the content asset by withholding the identifier from the unauthorized user. The rights holder may control access to the content asset by encrypting the decryption key, such as before distributing the decryption key. The rights holder may selectively distribute decryption information to authorized users for decrypting the decryption key.

The timing of user access to the content asset may be controlled by generating or transmitting (e.g., broadcasting) a transaction comprising the key to the distributed network or the distributed database at a select time or date. The rights holder may generate and/or transmit (e.g., broadcast) a transaction that may be time-locked. For example, the transaction may comprise code that indicates a period of time or a date. The time lock code may cause the transaction to not be broadcast to the distributed database until the indicated period of time passes or the indicated date arrives. As another example, the transaction may comprise a time lock parameter that mandates a minimum time before the transaction may be recorded in the distributed database, such as accepted into a block, even after the transaction may be broadcast.

The transaction may be configured to remain in a memory pool. The transaction may be configured to remain in the distributed database for a limited period of time. For example, a temporarily-stored transaction may be desirable if the transaction comprises the decryption key for content associated with a live event. The transaction may be pruned from the memory pool after the period of time. The transaction may not comprise an incentive, such as a fee value. The transaction may comprise a fee value that may not be sufficient to entice one or nodes to validate the transaction.

The transaction may be relayed by nodes. The rights holder may compensate the one or more nodes to relay or propagate the transaction. For example, the rights holder may compensate nodes via a payment channel. The rights holder may compensate nodes after the transaction has been removed from the memory pool. For example, the rights holder may generate a time locked transaction that may be configured to compensate one or more nodes if the transaction remains in the pool for an indicated amount of time. If the transaction does not remain in the pool for an indicated amount of time, the transaction may be configured to refund the rights holder. For example, if the transaction is pruned from the pool, validated, or recorded on a distributed database before the indicated amount of time, the rights holder may be refunded.

The rights holder may generate a distributed database that comprises a protocol configured to remove the transaction from the distributed database. For example, the distributed database may comprise a block structure in which blocks may comprise a permanent transactions section and a removable transactions section. The permanent transaction sections may be immutable. The removable transaction sections may be edited or modified, such as to remove a transaction from the block. The distributed database may comprise a data fee structure in which transactions may incur a fee for the time that they remain in the removable transaction section of the block. A party associated with the transaction may pay the fee at indicated time periods or the transaction may be removed.

The extent of user access to the content asset may be controlled by generating a plurality of transactions wherein two or more of the plurality of transactions may comprise keys that decrypt different parts of the content asset. As an example, if the content asset is a video file associated with a series, each key may decrypt a different segment of the file corresponding to a different episode of the series. The rights holder may generate or broadcast the plurality of transactions at staggered or different times. The rights holder may wish to distribute decryption keys for different parts of a movie to prevent viewers from skipping ahead to a later part of the movie.

The rights holder may directly authenticate one or more users, such as before granting access to the content asset. For example, the rights holder and the user may engage in a peer-to-peer transaction. The transaction may comprise a distributed database transaction, such as a digital ledger transaction. The use of the digital ledger may establish trust between the parties, as transactions may be verified against the other transactions in the ledger. The rights holder and the user may engage in an exchange of digital currency. The transaction may establish trust between the parties by requiring authentication of the identity of the parties, such as with digital signatures.

The rights holder and the user may generate a series of interrelated peer-to-peer transactions for adjustable payments. For example, the user may adjust the transaction amount to increment payments for access to additional content assets or for additional parts of the content asset. As the transaction amount is adjusted, the rights holder may distribute transaction identifiers or decryption keys corresponding to different assets or parts of the content asset. Traditionally, the user may pay for the entirety of the content asset irrespective of the portion of the content asset that the user accesses or consumes. Adjustable amount transactions may grant the user flexibility. Adjustable amount transactions may reduce the risk that the user faces when paying a flat price for access to content without knowing if the user will like the content or wish to access the entirety of the content.

A series of adjustable amount transactions may be useful if the rights holder encrypts different parts of the content asset with different keys. For example, the rights holder may encrypt every minute of a video with a new key. The user may generate a transaction to pay for the key to decrypt the first part of the content asset. If the user wishes to access the next part of the content asset, the user may generate a subsequent transaction to pay for the next part of the content asset. Instead of generating a subsequent transaction to pay only for access to the next part of the content asset, the user may generate a subsequent transaction that pays for the first part of the content asset and the next part of the content asset. The subsequent transaction may invalidate the first transaction. The invalidation of the first transaction may function to minimize the total number of transactions that the rights holder may receive. The invalidation of the first transaction may function to minimize the number of transactions that must be validated by nodes of the distributed database. The user may generate as many transactions as needed to pay for access to parts of the content asset.

The first of the series of adjustable amount transactions may comprise a payment from a payor, such as a user, to an output. The output may comprise an address associated with the payor. The address of the payor may comprise a string of characters, such as alphanumeric characters. The address may comprise a public receiving address or change address. The address may be associated with a wallet. A wallet may comprise a structured file or a database. The wallet may store a private key of a party, such as the payor.

The first transaction may require digital signatures of the payor and a payee, such as the rights holder. The first transaction may be digitally signed by the parties, such as with private keys. After the first transaction is signed, the first transaction may be broadcast across the distributed network.

A second transaction may be generated which may be connected to the output of the first transaction. The second transaction may comprise two outputs. The first output may allocate a portion of the payment of the first transaction to the payor. The second output may allocate the remaining portion of the payment of the first transaction to the payee. The second transaction may be digitally signed by the payor. The transaction may be broadcast, such as by the payor. In order to allocate greater portions of the payment of the first transaction to the payee, the payor may update the payment allocations to the parties and re-sign the transaction. In exchange for increased payment allocation, the payee may distribute one or more transaction identifiers or decryption keys to the payor.

In order to establish a peer-to-peer system of trust, a refund transaction may be generated. The refund transaction may be connected to the output of the first transaction. The refund transaction may refund the payment in the first transaction to the payor. The refund transaction may be digitally signed by the payee and the payor. The refund transaction may be time locked such that the refund transaction may not be accepted by a block until an indicated time elapses. The refund transaction may be broadcast. Once the indicated time elapses, the refund transaction may be validated or may not be validated. For example, the refund transaction may be accepted by a block or may not be accepted by a block in a blockchain.

The refund transaction may not be validated if the second transaction was validated. For example, the refund transaction may not be accepted by the block if the second transaction was accepted by a block in the blockchain. The nodes may identify the second transaction and flag the refund transaction as an attempt at double-spending. The refund transaction may be flagged as an attempt at double-spending because the refund transaction comprises a transfer of value that was already transferred in the second transaction. The nodes may recognize that the payor may no longer be in possession of the value.

However, the refund transaction may be validated if the payee disappears or halts. The payee may not sign the transaction. The payee may leave the payment allocated to the payee in the second transaction in limbo. If the refund transaction is validated, the payment of the first transaction may be refunded to the payor.

Figure 5:
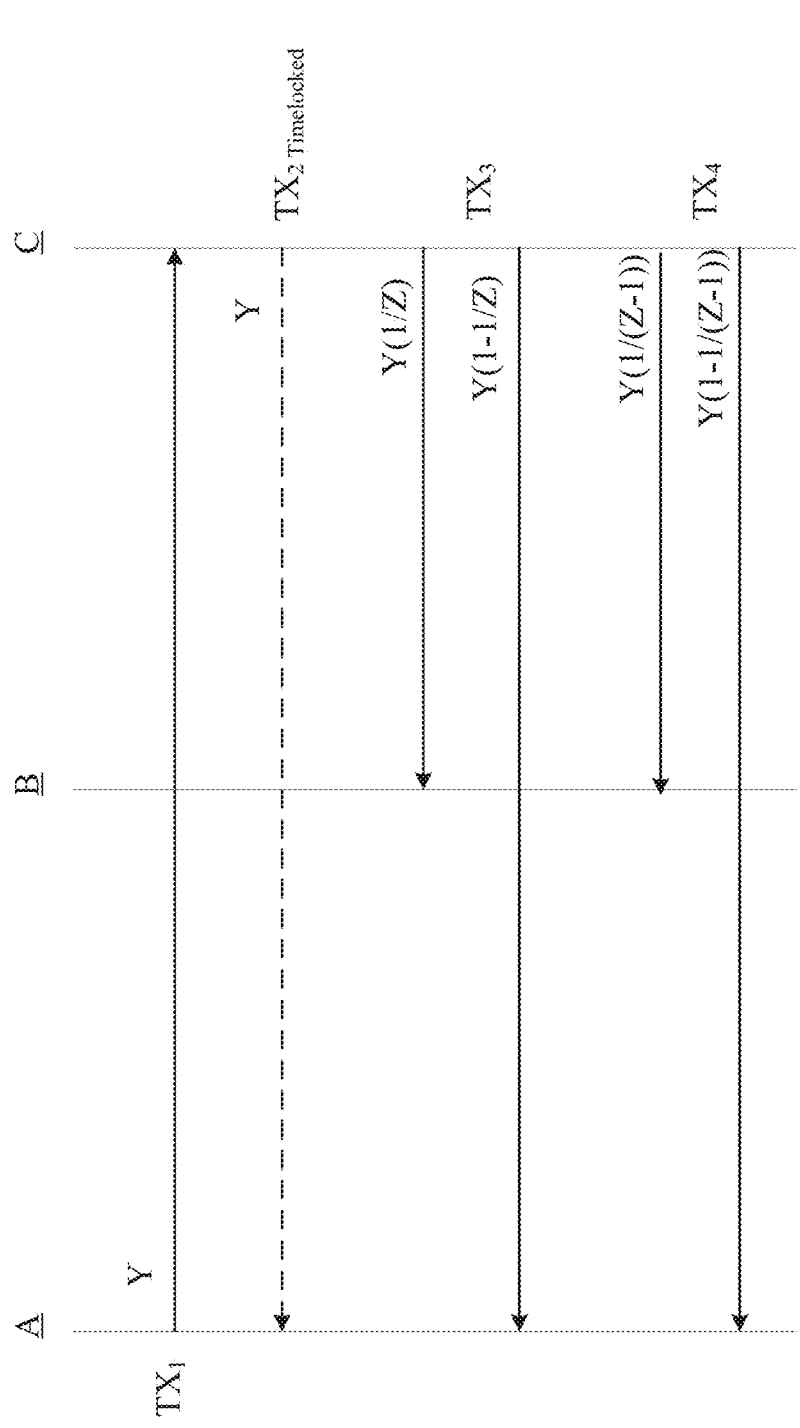
FIG. 5 is a block diagram of an example series of transactions.

Referring to FIG. 5, a party A may generate a first transaction $TX_1$. In the transaction $TX_1$, the party A may allocate an amount Y to transfer to an output C. C may comprise an address associated with A. The party A and a party B may sign the transaction $TX_1$.

The party A may generate a second transaction $TX_2$. The transaction $TX_2$ may comprise a refund transaction. The transaction $TX_2$ may transfer the amount Y from C back to the party A. However, the transaction $TX_2$ may be time locked. For example, the transaction $TX_2$ may be time locked such that it may not be validated or broadcast until an indicated time. The transaction $TX_2$ may be time locked such that the amount Y will not be transferred back to A until the indicated time.

The party A may generate a third transaction $TX_3$. In the third transaction $TX_3$, a part of the amount Y, such as may be represented by $Y(1/Z)$ may be transferred to the party B. Z may be a positive number. Z may be a number greater than zero and less than or equal to one. The remainder of the amount Y, such as may be represented by $Y(1-1/Z)$, may be transferred back to the party A. The party A may sign the third transaction $TX_3$. The party B may sign the third transaction $TX_3$. In signing the third transaction $TX_3$, the party B may provide a key to the party A. For example, the amount $Y(1/Z)$ may comprise payment for the key. The party B's signature may comprise the key. The key may be configured to decrypt a first part of an encrypted content asset. The amount $Y(1/Z)$ may comprise payment for the first part of the encrypted content asset.

The party B may not sign the transaction $TX_3$. The party B may not sign the transaction $TX_3$ before the indicated time for which the transaction $TX_2$ is time locked. The transaction $TX_2$ may be broadcast. The amount $Y(1/Z)$ in the transaction $TX_3$ may not have effectively been transferred to the party B as a result of the party B's failure to sign the transaction $TX_3$. Therefore, the transaction $TX_2$ may be validated, as it may be confirmed that the amount Y remains with C. The transaction $TX_2$ may effectively transfer the amount Y back to the party A.

If the party B signs the transaction $TX_3$, the party A may subsequently decide to increase the amount paid to the party B. For example, if the party A is the user and the party B is the rights holder, the party A may wish to pay for a second key to view a second part of the content asset. The party A may generate a fourth transaction $TX_4$. The transaction $TX_4$ may transfer an increased amount, such as may be represented as $Y(1/(Z-1))$, to the party B. The transaction $TX_4$ may transfer the remainder of Y, such as $Y(1-1/(Z-1))$, back to the party A. The transaction $TX_4$ may invalidate the transaction $TX_3$. The party A may generate subsequent transactions to transfer an adjusted part of the amount Y to the party B. Any subsequent transactions may invalidate the former transaction.

As an example, a user who wishes to watch a movie may generate one transaction for each of the first twenty minutes of a movie, comprising a total of twenty transactions. The user may receive at least one key for each transaction generated. After twenty minutes, the user may decide to discontinue watching the movie. At the point that the user decides to discontinue watching the movie, the user may not generate any subsequent transactions. In return, the rights manager may not release any more keys to the user. Instead of bearing the cost of accessing the entire move, the user may have only paid for the first twenty minutes.

Figure 6:
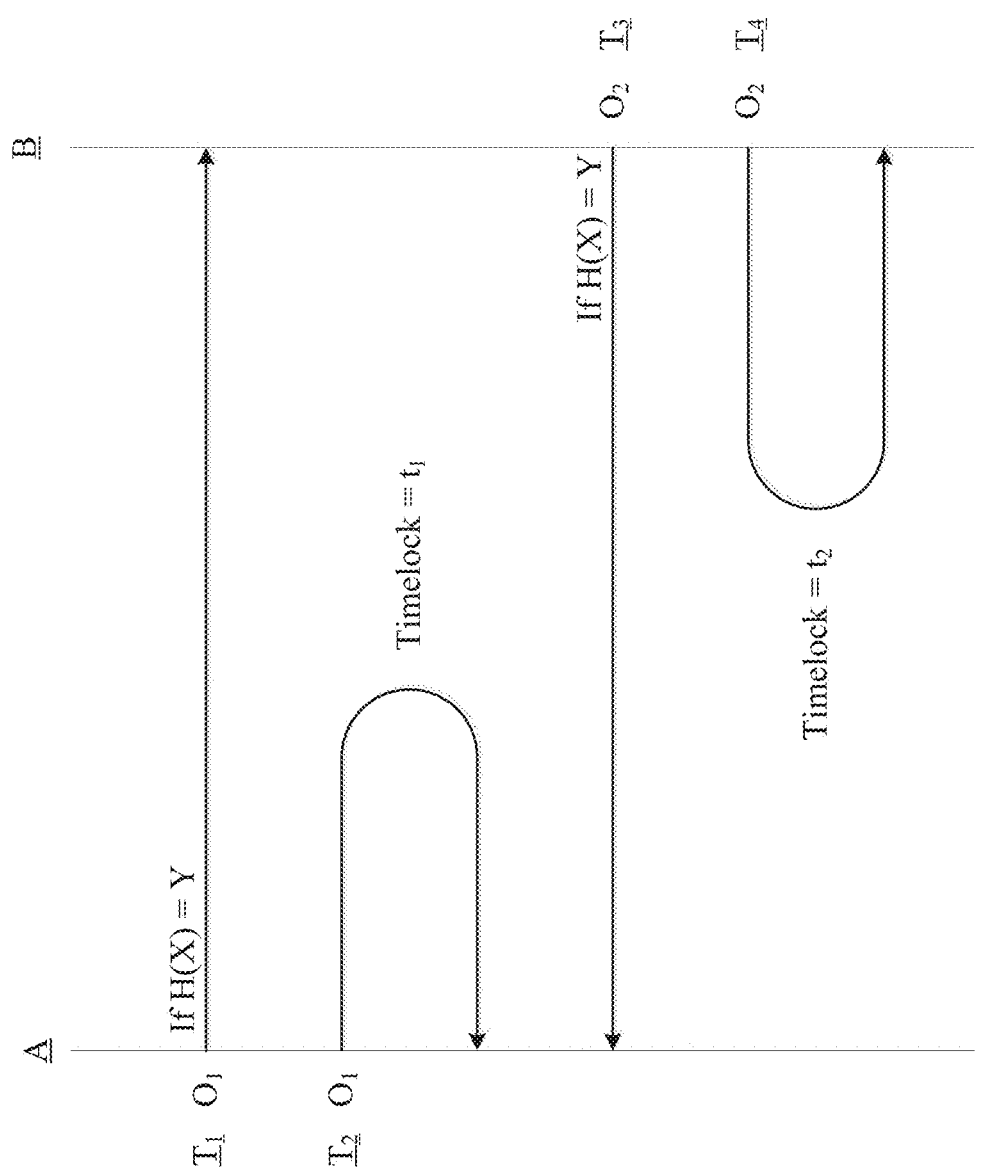
FIG. 6 is a block diagram of an example series of transactions.

The rights holder and the user may engage in a series of interrelated peer-to-peer transactions configured to establish trust between the parties. Referring to FIG. 6, a party A (e.g., the rights holder or the user) may broadcast a first transaction $T_1$ with an output $O_1$ to a party B. The output $O_1$ may comprise an amount to be transferred to the party B (e.g., the rights holder or the user, different than party A). The amount may comprise consideration or payment, such as units of a digital currency.

However, the first transaction $T_1$ may be missing an element necessary for the transaction to be validated or recorded in the distributed ledger. The first transaction $T_1$ may indicate an element X that may be required for the first transaction $T_1$ to be processed. Processing the transaction may comprise one or more of validating, recording, or executing the transaction or effectively transferring the output of the transaction. For example, the first transaction $T_1$ may comprise a script with a condition requiring the element X. The script may mandate that the first transaction $T_1$ can only be processed if a hash of X equals a known number Y. The missing element X may need to be provided for the first transaction $T_1$ to be processed. X may comprise a decryption key. Absent the element, the first transaction $T_1$ may not effectively transfer the output $O_1$ to the party B.

The party A may know or have access to the missing element X. The party B may wish to know or access the missing element X. For example, the party A may comprise the rights holder and the party B may comprise the user. The missing element X may comprise a decryption key that the party B may purchase from the party A to access the content asset The party A may broadcast a second transaction $T_2$ with an output comprising the output $O_1$ of the first transaction $T_1$ to be transferred back to the party A or to an address associated with the party A. The address of the party A may comprise a string of characters, such as alphanumeric characters. The address may comprise a public receiving address or change address. The address may be associated with a wallet. A wallet may comprise a structured file or a database. The wallet may store a private key of the party A.

The second transaction $T_2$ may be time locked. For example, the second transaction $T_2$ may be time locked such that it may not be validated or recorded on a distributed ledger until a time $t_1$. The second transaction $T_2$ may be time locked such that the output $O_1$ may not be transferred back to the party A until the time $t_1$.

The party B may broadcast a third transaction $T_3$ with an output $O_2$ to the party A. The output $O_2$ may comprise an amount to be transferred to the party A. The amount may comprise units of a digital currency. The units may be of a different digital currency than the units in the output $O_1$ of the first transaction $T_1$. The third transaction $T_3$ may be missing an element necessary for the third transaction $T_3$ to be processed. The third transaction $T_3$ may comprise the same element X missing from the first transaction $T_1$. For example, the third transaction $T_3$ may comprise a script with a condition that the third transaction $T_3$ may only be processed if a hash of X equals a known number Y. The missing element X may need to be entered in the third transaction $T_3$ in order for the third transaction $T_3$ to be processed.

The party B may broadcast a fourth transaction $T_4$ with an output comprising the output $O_2$ of the third transaction $T_3$ to be transferred back to the party B or to an address associated with the party B. The fourth transaction $T_4$ may be time locked. For example, the fourth transaction $T_4$ may be time locked such that it may not be validated or recorded on a distributed ledger until a time $t_2$ passes. The fourth transaction $T_4$ may be time locked such that the output $O_2$ may not be transferred to the party A until a time $t_2$ passes. The fourth transaction $T_4$ may be time locked for a greater period $t_2$ of time than the time lock period $t_1$ of the second transaction $T_2$.

The party A may provide the missing element X to the third transaction $T_3$ so that the third transaction $T_3$ may be processed. If X is such that a hash of X equals Y, the third transaction $T_3$ may be processed. Once the missing element X is provided, the third transaction $T_3$ may effectively transfer the output $O_2$ of the third transaction $T_3$ to the party A. Once the party A provides the missing element X, the party B may observe the missing element X and provide the missing element X to the first transaction $T_1$. Once the missing element X is provided to the first transaction $T_1$, the first transaction $T_1$ may effectively transfer the output of the first transaction $T_1$ to the party B. If the missing element X comprises a decryption key, the first transaction $T_1$ or the third transaction $T_3$ may comprise a script that checks that the missing element X that is revealed is configured to decrypt the encrypted content asset.

If the first transaction $T_1$ and the fourth transaction $T_4$ are processed, the second transaction $T_2$ and the third transaction $T_3$ may not be processed. The periods of time indicated by the time lock functions of the second transaction $T_2$ and the third transaction $T_3$ may lapse after the first transaction $T_1$ and the fourth transaction $T_4$ are processed. The second transaction $T_2$ and the third transaction $T_3$ may be flagged as a double-spending attempted, as the amounts in the outputs $O_1$, $O_2$ of the transactions $T_2$, $T_3$ may have already been recorded as spent in the first transaction $T_1$ and the fourth transaction $T_4$.

If the periods of time $t_1$, $t_2$ (indicated by the time lock functions of the second transaction $T_2$ and the third transaction $T_3$) lapse before the first transaction $T_1$ and the fourth transaction $T_4$ have been processed, the second transaction $T_2$ and the third transaction $T_3$ may be processed. If the second transaction $T_2$ and the third transaction $T_3$ are processed, the transactions $T_2$, $T_3$ may effectively transfer the amounts in the outputs $O_1$, $O_2$ of the first transaction $T_1$ and the fourth transaction $T_4$ back to their original senders.

The series of interrelated peer-to-peer exchanges may prevent a scenario where the user pays the rights holder for a key, but is not provided the key. The series of interrelated peer-to-peer exchanges may prevent a scenario where the rights holder provides the key to the user, but the rights holder does not receive payment for the key. The series of interrelated peer-to-peer exchanges may be configured such that the user pays the rights holder and the rights holder provides the key concurrently. If the user is not provided the key, the user may be refunded for any payment made for the key.

The rights holder and the user may engage in an exchange across two digital ledgers. The rights holder and the user may each transact on a different blockchain. The rights holder and the user may each possess units of a different digital currency. The digital currencies may correspond to a different distributed ledger, such as a different blockchain.

Figure 7:
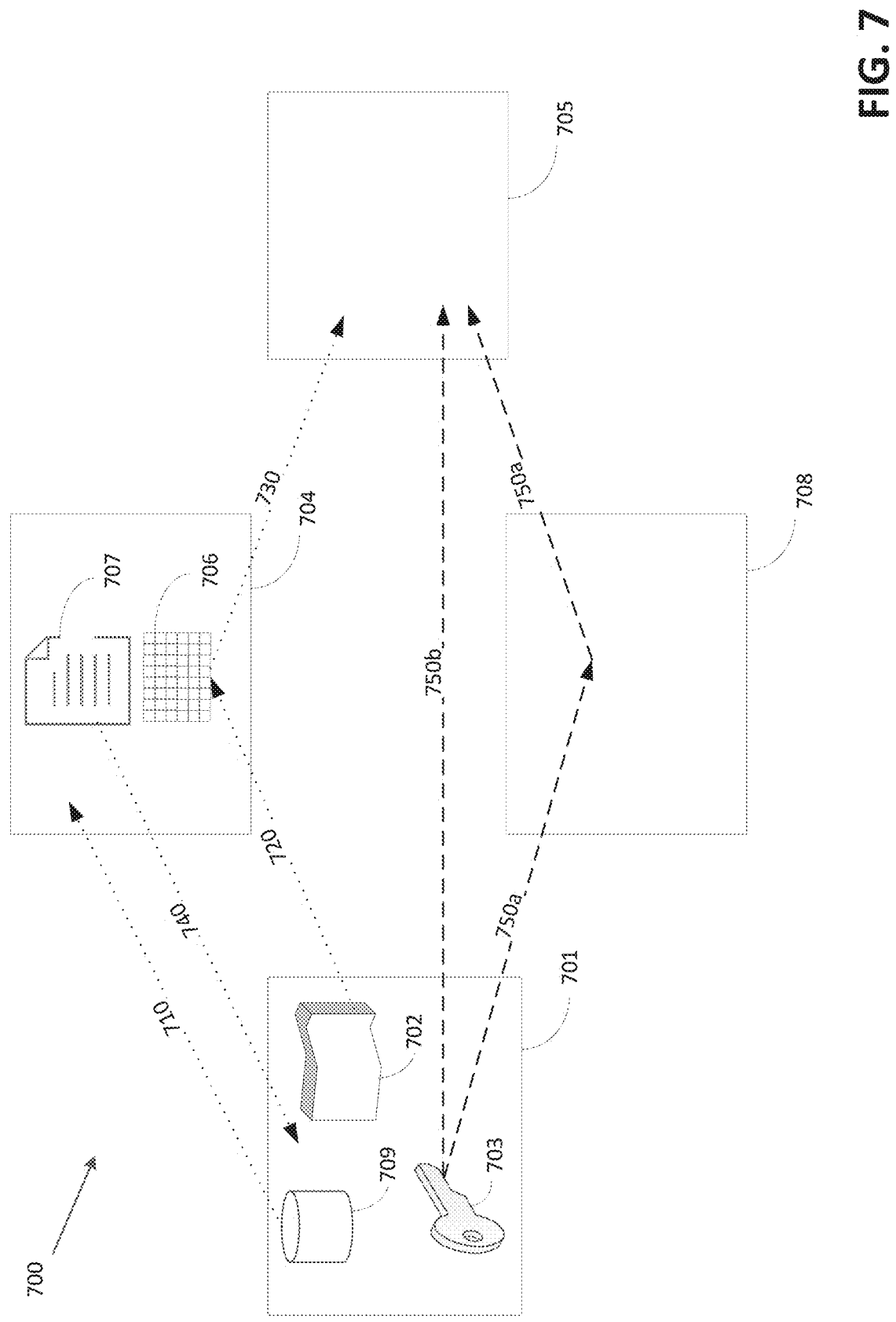
FIG. 7 is a block diagram of an example system architecture.

Referring to FIG. 7, an example system 700 may comprise a content delivery network 704. The content delivery network 704 may comprise a distributed server, such as a distributed content delivery network or a peer-to-peer content delivery network. The peer-to-peer content delivery network may comprise a distributed network of nodes. In order to join the network or request a service performed by nodes in the network, a node may contribute resources or services to other nodes in the network. For example, the node may perform a proof of bandwidth. The proof of bandwidth may comprise the node contributing bandwidth to the network. The node may receive compensation for providing services or resources to other nodes. For example, the node may receive a unit of digital currency or cryptocurrency. The node may receive compensation for contributing bandwidth. The proof of bandwidth may maintain the anonymity of the nodes. For example, the identity of the node may not be traced to the proof of bandwidth performed by the node or the bandwidth contributed by the node.

The content delivery network 704 may host content. The content may be stored in one or more nodes in the network 704. The nodes in the network may compile their bandwidth to store the content. The content of the content delivery network 704 may be organized in blocks 706. The blocks 706 may be organized as a sequence of blocks 706. A subset of the blocks 706 may comprise valid content. Another subset of the blocks 706 may comprise invalid content or no content. The network 704 may be unaware of which blocks 706 comprise valid content.

At step 710, a rights holder 701 may contribute bandwidth or compensation 709 in order to join or use the services of the content delivery network 704. The rights holder 701 may perform a proof of bandwidth to join the content delivery network 704. The rights holder 701 may provide payment to use the services of the content delivery network 704. The rights holder 701 may be similar to the rights holder 301 in FIG. 3. The rights holder 701 may comprise a node, such as a computing device.

At step 720, the rights holder 701 may store an encrypted content asset 702 on the network 704. The encrypted content asset 702 may be like the encrypted content asset 302 in FIG. 3. The rights holder 701 may store a hash of the encrypted content asset 702 on the content delivery network 704. The encrypted content asset 702 may be hosted by the content delivery network 704 in a block 706. The block 706 may be in a sequence of blocks 706. The rights holder 701 may instruct a user 705 to access the encrypted content asset 702 from the content delivery network 704. The rights holder 701 may indicate the block 706 in the sequence comprising the encrypted content asset 702 for the user 705 to access.

At step 730, the user 705 may access the block 706 comprising the encrypted content asset 702. If the rights holder 701 stores the hash of the encrypted content asset 702, the user 705 may access the hash of the encrypted content asset 702 from the indicated block 706. The hash may serve as a layer of security for the user 705. For example, the user 705 may receive authentication data from the rights holder 701. The user 705 may use the authentication data from the rights holder 701 to authenticate the hash. The user 705 may use the authentication data from the rights holder to verify that the encrypted content asset 702 or the content of the block 706 came from the rights holder 701. The hash may comprise a digital signature associated with the rights holder 701. The user 705 may use the hash to verify that the content of the block 706 does not comprise malicious data, corrupted data, or random data.

At step 740, the rights holder 701 may confirm that the content delivery network 704 delivered the encrypted content asset 702 to the user 705. For example, the content delivery network 704 may record which blocks 706 in the sequence were accessed. The content delivery network 704 may record a statistical count of the blocks 706 in the sequence, which were accessed. The rights holder 701 may access the record 707 of the accessed blocks 706. The rights holder 701 may analyze the number of times that the blocks 706 comprising the encrypted content asset 702 were accessed. The rights holder 701 may compare the number of times the blocks 706 comprising the encrypted content asset 702 were accessed. The rights holder 701 may confirm the veracity of a bill or charge for content distribution from the content delivery network 704 by comparing the content delivery network 704's count of accessed blocks with the blocks that the rights holder 701 instructed one or more users 705 to access.

At step 750a and 750b, the rights holder 701 may make a decryption key 703 available to the user 705. The decryption key 703 may be like the decryption key 303 in FIG. 3. The decryption key 703 may be configured to decrypt the encrypted content asset 702. At step 750a, the rights holder 701 may distribute the decryption key 703 across a network. For example, the rights holder 701 may record the decryption key 703 in distributed ledger 708, such as in the blockchain transaction of FIG. 4. The rights holder 701 may make an identifier associated with the ledger entry comprising the decryption key 703 available. The user 705 may locate the entry of the distributed ledger associated using the identifier. From the entry, the user 705 may obtain the decryption key 703.

At step 750b, the rights holder 701 may transmit the decryption key 703 directly to the user 705. For example, the rights holder 701 may transmit the decryption key 703 to the user 705 through email. The rights holder 701 may transmit the decryption key 703 to a device associated with the user 705, such as a media player. The decryption key 703 may be specific to the encrypted content asset 702. Once the user 705 receives the decryption key 703, the user 705 may decrypt the encrypted content asset 702 with the decryption key 703.

Figure 8:
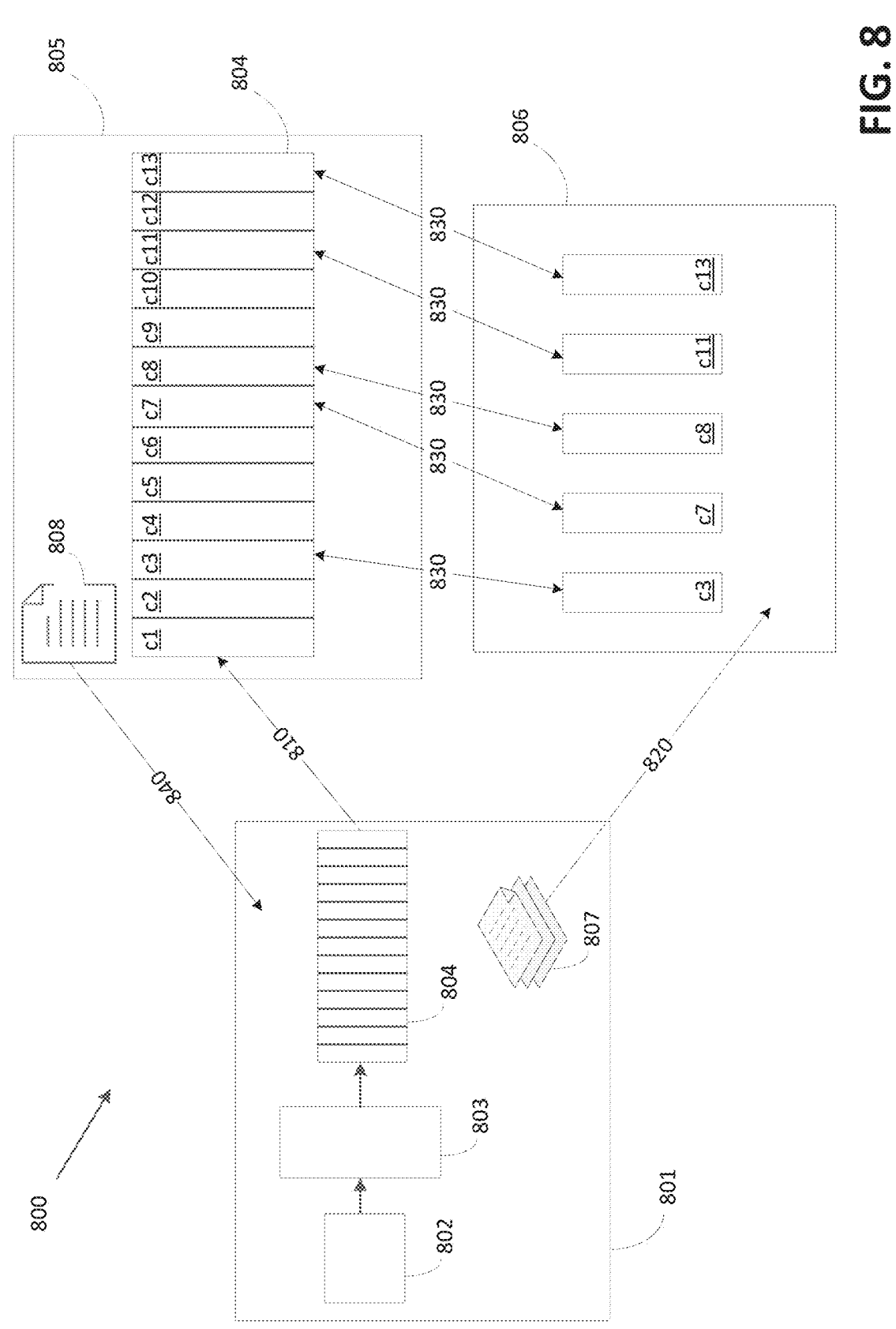
FIG. 8 is a block diagram of an example system architecture.

Referring to FIG. 8, an example system 800 may comprise a rights holder 801. The rights holder 801 may possess a content asset 802. The content asset 802 may be encrypted. The rights holder 801 may apply a code 803, such as a raptor code or a fountain code, to the content asset 802 to parse the content asset into a plurality of data chunks 804. A subset of the data chunks 804 may comprise valid parts of the content asset 802. Another subset of the data chunks 804 may comprise invalid data. The rights holder 801 may know which chunks 804 are valid and which chunks 804 are invalid. The chunks 804 may comprise a sequence. The rights holder 801 may know which chunks 804 in the sequence are valid and which chunks 804 in the sequence are invalid.

At step, 810, the rights holder 801 may transmit the chunks 804 to a content distributor 805. The rights holder 801 may store the chunks 804 at the distributor 805. The distributor 805 may comprise a content delivery network. The distributor 805 may comprise a computing device, such as a server. The distributor 805 may comprise a storage device or a database. The distributor 805 may not know which of the chunks 804 are invalid and which of the chunks 804 are valid.

At step 820, the rights holder 801 may transmit a list 807 of chunks 804 to a user 806. The rights holder 801 may transmit the list 807 of chunks 804 to the user 806 in exchange for payment. The user 806 may pay to access the content asset 802. The rights holder 801 may make a decryption key associated with the content asset 802 available to the user 806. The rights holder 801 may make a decryption key associated with the content asset 802 available to the user 806 via a distributed database or directly.

The list 807 of chunks 804 may comprise a plurality of links to select chunks 804. The list 807 of chunks 804 may comprise identification information associated with the select chunks 804. The list 807 may comprise identification of select chunks 804 by their location in the sequence of chunks 804. The list 807 may comprise valid chunks 804, such as chunks associated with the content asset 802. The list 807 may comprise invalid chunks 804. For example, the rights holder 801 may transmit a list 807 to the user comprising chunks c3, c7, c8, c11, and c13. Of the list 807, the chunks c3, c7, and c13 may comprise valid chunks. The chunks c8 and c11 may comprise invalid chunks. The user 806 may not know which chunks 804 of the list are valid or invalid.

The rights holder 801 may transmit a plurality of lists 807 of chunks to a plurality of users 806. The rights holder 801 may transmit different list 807 to one or more of the plurality of users. The lists 807 may be randomized. The lists 807 may comprise a mechanism to prevent a user 806 from downloading a chunk 804 from the distributor 805 more than once. For example, the lists 807 may comprise unique links, such as application programming interface (API) keys. A single unique link may only allow one access to a select chunk 804. The rights holder 801 may keep a record of the chunks 804 that were included in the lists 807 sent to the plurality of users 806. Based on the record, the rights holder 801 may know how many times one or more of the chunks 804 should be accessed or received by users 806 from the distributor 805.

At step 830, the user 806 may access chunks 804 from the distributor 805. The user 806 may access the select chunks 804 in the list 807, such as the chunks c3, c7, c8, c11, and c13. The user may request the chunks c3, c7, c8, c11, and c13 from the distributor 805. The distributor 805 may transmit the requested chunks c3, c7, c8, c11, and c13 to the user 806. The user 806 may decrypt the chunks c3, c7, c8, c11, and c13. The user 806 may combine the chunks c3, c7, c8, c11, and c13 to comprise the content asset 802. The user 806 may access the content asset 802.

At step 840, the rights holder 801 may perform a proof of distribution to verify that the distributor 805 distributed the correct data chunks 804 to the one or more users 806. For example, if the distributor 805 charges the rights holder 801 for distributing data, the rights holder 801 may verify that the distributor 805 is charging the rights holder 801 for the correct amount of data. The distributor 805 may record a tally 808 of the chunks 804 that were accessed by the user 806. The distributor 805 may record a tally 808 of the chunks 804 that were accessed by a plurality of users 806. The distributor 805 may transmit the tally 808 to the rights holder 801.

The rights holder 801 may verify the tally 808. The rights holder 801 may use the tally 808 to confirm that the chunks 804 in the lists 807 to the plurality of users 806 were provided by the distributor 805. For example, the rights holder 801 may compare the tally 808 to the record of the chunks 804 included in the lists 807 sent to the plurality of users 806. The verification of the tally 808 may serve as a provable billing system. The rights holder 801 may pay the distributor 805 based on the confirmation that the distributor 805 provided the chunks 804 in the lists 807. The distributor 805 may be deterred from falsifying the tally 808 because the distributor may not have knowledge of which chunks 804 were valid. The tally 808 may not be skewed by multiple downloads from a same user if the lists 807 comprise links that only allow one download.

Figure 9:
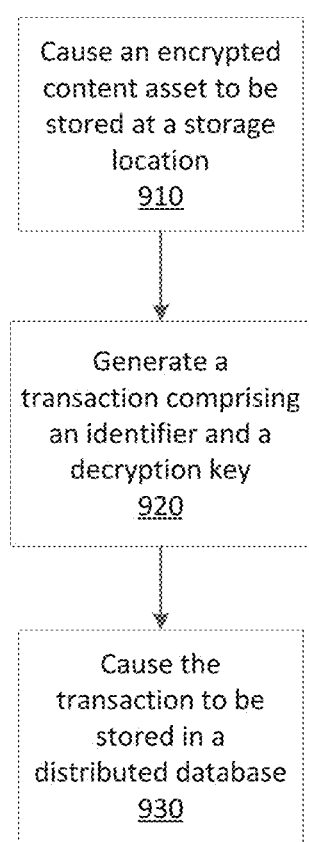
FIG. 9 is a flow diagram of an example method.

Referring to FIG. 9, an encrypted content asset may be caused to be stored at a storage location, at step 910. The encrypted content asset may comprise data or content, such as video, audio, image, or game content. The encrypted content asset may be encrypted with an encryption algorithm. The encrypted content may be encrypted with a key, such as a symmetric-key or one of an asymmetric key pair. The encrypted content asset may be completely encrypted or partially encrypted. The encrypted content asset may comprise a hash of an encrypted content asset. The encrypted content asset may be hashed with a key or signature, such as to provide verification of the source of the encrypted content asset.

The storage location may comprise a computing device. The storage location may comprise a server, such as a content server, a database server, a hosting server, a content delivery network, or a distribution server. The server may comprise a distributed server, such a as peer-to-peer content delivery network. The storage location may comprise a plurality of computing devices. The storage location may comprise an external storage device, such as a solid state memory device or a volatile memory device. The storage location may comprise a local cache. The local cache may be associated with the one or more user devices.

The storage location may be accessible by one or more user devices. The one or more user devices may comprise computing devices. The one or more user devices may access content at the storage location. For example, the one or more user devices may access the encrypted content asset at the storage location. The one or more user devices may download content from the storage location. The one or more user devices may stream content from the storage location.

At step 920, a transaction may be generated. The transaction may be configured for a distributed database, such as a distributed ledger or a blockchain. The transaction may comprise an identifier. The identifier may comprise an address or a key. The identifier may be associated with the encrypted content asset. The identifier may be associated with a source of the transaction, such as a digital rights holder or a digital rights manager. The identifier may comprise an input or an output of the transaction.

The transaction may comprise a decryption key. The decryption key may be configured to decrypt at least a portion of the encrypted content asset. The decryption key may be a symmetric-key, such as a key configured to perform decryption and encryption. The decryption key may be one of an asymmetric key pair, such a key that encrypts and a key that decrypts.

The decryption key may be associated with the encrypted content asset. The decryption key may be associated with the source of the encrypted content asset. The decryption key may be specific to a digital rights holder or a digital rights manager. The decryption key may be associated with a user. The decryption key may be associated with the identifier. The decryption key may be specific to the encrypted content asset. The decryption key may be generic. For example, the decryption key may be generic to more than one encrypted content asset or more than one user.

The output of the transaction may comprise the decryption key. For example, an address in the output of the transaction may comprise the decryption key. The input of the transaction may comprise the decryption key. For example, a public key in the input of the transaction may comprise the decryption key. The rights holder may introduce the key in the transaction using a mechanism for inserting metadata into a distributed database, such as in an operation code. The transaction may comprise an encrypted version of the decryption key. The transaction may comprise the decryption key within another key, such as a key associated with a digital signature of the transaction or a key used to encrypt data of the transaction.

The transaction may comprise a mechanism to store metadata in a distributed database. A mechanism to store metadata may comprise an operation code. For example, the mechanism may comprise the OP_RETURN operation code from the Bitcoin Script language, which may allow arbitrary data to be added to a transaction. The transaction may comprise an OP_RETURN field. The decryption key may be associated with the OP_RETURN field.

The transaction may comprise a fee value. The fee value may comprise a spendable output, such as a unit of digital currency. The fee value may comprise a transaction fee. The fee value may increase the likelihood that the transaction may be stored or accepted in the distributed database. The fee value may comprise an incentive for nodes of a distributed database to validate or accept the transaction. For example, the fee value may incentivize one or more nodes to record the transaction in the next block of a blockchain. The transaction may not comprise a fee value. The transaction may be configured to be stored temporarily on the distributed database, such as in a memory pool of the distributed database.

The transaction may comprise a time lock. The time lock may be configured to restrict access to the decryption key. The time lock may comprise a function that prevents the transaction from being broadcast to a distributed database until an indicated time. The time lock may comprise a function that prevents the transaction from being validated, such as by nodes of a distributed database, until the indicated time. The time lock may comprise a function that prevents the transaction from being recorded or stored on the distributed database until the indicated time. The time lock may comprise a function that prevents a fee value, such as a spendable output, of the transaction from being transferred or redeemed until the indicated time. The indicated time of the time lock may comprise, for example, a period of time, an interval of time, a unit of time, a date, or a time lock. The indicated time of the time lock may be dependent on the occurrence of another event, such as the validation of another transaction on the distributed database.

At step 930, the transaction may be caused to be stored in the distributed database. The distributed database may comprise a distributed ledger, such as a blockchain. For example, the transaction may broadcast to a network associated with the distributed database. The transaction may be validated by one or more nodes associated with the distributed database. The transaction may be recorded to the distributed database. For example, the transaction may be added to the distributed ledger. The transaction may be accepted or added to a block of the blockchain. The block may be accepted or added to the blockchain. The block may be broadcast to the network, such as to nodes in the network. The transaction may be stored in the memory pool of the distributed database. One or more nodes may relay or propagate the transaction.

The distributed database may be accessible by the one or more user devices. The devices may monitor the distributed database. For example, the devices may monitor the distributed database for the transaction comprising the identifier. The devices may search the entries or transactions of the distributed database, such as for the identifier. The devices may access the distributed database using a program or an application. The devices may access the distributed database using the identifier of the transaction.

The devices may access the transaction on the distributed database. The devices may locate the transaction using the identifier. The devices may download the transaction from the distributed database. The devices may access the decryption key from the distributed database, such as by accessing or downloading the transaction.

As an example, a recording studio owner may store an encrypted audio file on a content server. The owner may generate a transaction for a blockchain comprising an identifier associated with the audio file and a key to decrypt the encrypted audio file. The decryption key may be in an OP_RETURN field of the transaction. The transaction may comprise a transaction fee to increase the chances of the transaction being added to the blockchain by providing an incentive to nodes to add the transaction to a block and add the block to the blockchain. The owner may broadcast the transaction across a distributed network associated with the blockchain. The transaction may be validated and recorded in a block by nodes associated with the distributed network. The block may be added to the blockchain by nodes associated with the distributed network.

Figure 10:
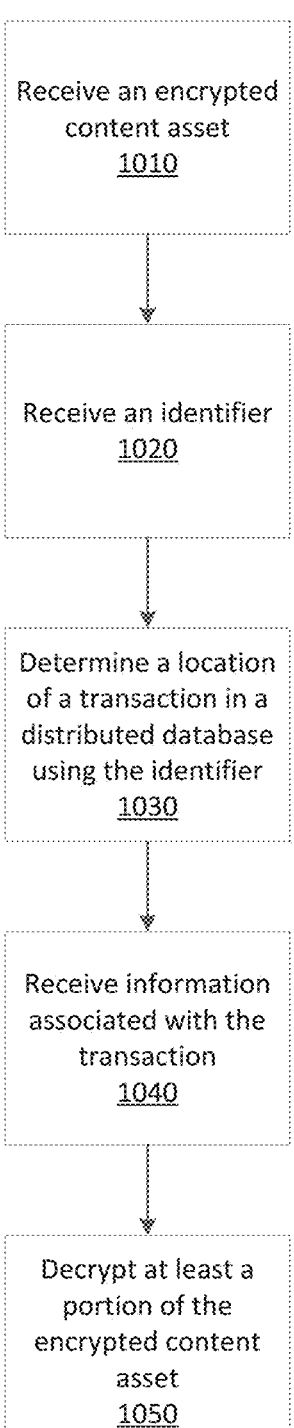
FIG. 10 is a flow diagram of an example method.

Referring to FIG. 10, an encrypted content asset may be received, at step 1010. The encrypted content asset may comprise data or content, such as video, audio, image, or game content. The encrypted content asset may be encrypted with an encryption algorithm. The encrypted content may be encrypted with a key, such as a symmetric-key or one of an asymmetric key pair. The encrypted content asset may be entirely encrypted or partially encrypted. The encrypted content asset may comprise a digital signature. The digital signature may comprise a key or hash, such as to provide verification of a source of the encrypted content asset.

The encrypted content asset may be received by a computing device, such as the user device 305 in FIG. 3. For example, the encrypted content asset may be streamed to the computing device. The stream may comprise transmitting packets of the encrypted content asset to the computing device. The encrypted content asset may be accessed at a content server, such as over a network. For example, the encrypted content asset may be downloaded from the content server to a computing device. The encrypted content asset may be stored, such as at the computing device or a local cache.

At step 1020, an identifier may be received. The identifier may be associated with decryption of the encrypted content asset. The identifier may be associated with a source of a transaction in a distributed database. The identifier may be associated with a source of the encrypted content asset. The identifier may comprise a key or an address. The identifier may comprise an address in an output of a transaction. The identifier may be used to identify a transaction in the distribute database. The identifier may be received by the computing device. The identifier may be received from a rights holder. The identifier may be received from the source of the encrypted content asset.

At step 1030, a location of a transaction in a distributed database may be determined. The distributed database may be stored across a network of nodes. The distributed database may comprise a distributed ledger or a blockchain. The distributed database may comprise a plurality of transactions.

The location of the transaction in the distributed database may be determined using the identifier. The transaction may comprise the identifier. The location of the transaction in the distributed database may be determined by searching the distributed database for the identifier. The location of the transaction in the distributed database may be determined by monitoring a plurality of transactions of the distributed database. The location of the transaction in the distributed database may be determined by the computing device.

At step 1040, information associated with the transaction may be received. The information may be received based on the determining the location of the transaction in the distributed database. The information may comprise the identifier used to determine the location of the transaction in the distributed database. The information may be received by signing the transaction, such as to reveal a public key in the input of the transaction. The information may be associated with decryption of the encrypted content asset. The information may comprise the decryption key configured to decrypt the encrypted content asset. The information may comprise the decryption key configured to decrypt at least a portion of the encrypted content asset. The information associated with the transaction may be encrypted, such as to maintain the privacy of the information in the distributed database.

At step 1050, the encrypted content asset may be decrypted. At least a portion of the content asset may be decrypted. The content asset may be decrypted using the information associated with the transaction. For example, the content asset may be decrypted using the decryption key in the transaction. If the information is encrypted, the information may first be decrypted to access the information. At least a portion of the encrypted content asset may be decrypted by a user device. The content asset may be accessed. For example, the content asset may be opened, rendered, ran, or processed.

As an example, a parent may receive an encrypted file comprising a school portrait of a child in an email from a photo studio. The parent may receive an identifier associated with the photo studio in exchange for payment for the school portrait. A computer associated with the parent may monitor a distributed ledger in search of a ledger entry marked with the identifier of the photo studio. The computer may identify a transaction marked with the identifier of the photo studio. The computer may download the transaction. The computer may obtain a decryption key configured to decrypt the encrypted file from the transaction. The computer may decrypt the encrypted file. The parent may open the file and view the school portrait.

Referring to FIG. 11, an encrypted content asset may be caused to be stored at a storage location, at step 11. The encrypted content asset may comprise data or content, such as video, audio, image, or game content. The encrypted content asset may be encrypted with an encryption algorithm. The encrypted content may be encrypted with a key, such as a symmetric-key or one of an asymmetric key pair. The encrypted content asset may be completely encrypted or partially encrypted. The encrypted content asset may comprise a hash of an encrypted content asset. The encrypted content asset may be hashed with a key or signature, such as to provide verification of the origin of the encrypted content asset.

The encrypted content asset may be caused to be stored by a rights holder, such an entity that owns rights to the content asset. The storage location may comprise a database. The storage location may comprise a cache. The storage location may comprise a computing device. The storage location may comprise volatile or non-volatile memory. The storage location may be associated with a content distributor or network. The encrypted content asset may be accessible by one or more user devices. For example, the one or more user devices may download the encrypted content asset from the storage location.

At step 1120, a first transaction may be generated. The first transaction may be generated by the rights holder. The first transaction may be configured for a distributed database, such as a distributed ledger or a blockchain. The first transaction may comprise a first identifier. The first identifier may be associated with the rights holder. The first identifier may be associated with the encrypted content asset. The first identifier may comprise an address or a key, such as in the input or the output of the first transaction.

The first transaction may comprise a first decryption key. The first decryption key may be encrypted, such as to maintain the privacy of the first decryption key. The first decryption key may be configured to decrypt at least a portion of the encrypted content asset. The transaction may comprise an input field comprising the first decryption key. For example, the transaction may comprise a public key in the input field, wherein the public key comprises the first decryption key. The transaction may comprise an output field comprising the first decryption key. For example, the transaction may comprise an address in the output field, wherein the address comprises the first decryption key. The first transaction may comprise a field to store metadata comprising the first decryption key. For example, the first transaction may comprise an OP_RETURN field comprising the first decryption key.

At step 1130, the first transaction may be caused to be stored in the distributed database. The first transaction may be caused to be stored in the distributed database by the rights holder. The distributed database may comprise a distributed ledger or a blockchain. The first transaction may be broadcast to the distributed database. The first transaction may be added to the distributed database. For example, the first transaction may be validated by one or more nodes associated with the distributed database. The first transaction may be added to a block. The block may be added to a blockchain. The first transaction may be sent to a memory pool of the distributed database. The first transaction may be relayed or propagated by one or more nodes associated with the distributed database.

The distributed database may be accessible by the one or more user devices. The one or more user device may determine the location of the transaction in the distributed database using the first identifier.

At step 1140, a second transaction may be generated. The second transaction may be configured for the distributed database. The second transaction may comprise a second identifier. The second identifier may be associated with the rights holder. The second identifier may be associated with the encrypted content asset. The second identifier may comprise an address or a key. The second identifier may comprise an address, such as in the output of the second transaction. The second identifier may be used to locate the first transaction. The second identifier may be used to determine the location of the first transaction in the distributed database.

The second transaction may comprise a second decryption key. The second decryption key may be encrypted, such as to maintain the privacy of the second decryption key. The second decryption key may be configured to decrypt at least a portion of the encrypted content asset. The second decryption key may be configured to decrypt at least a portion of the second transaction. For example, the second decryption key may be configured to decrypt an output of the first transaction.

The second transaction may comprise an input field comprising the second decryption key. For example, the second transaction may comprise a public key in the input field, wherein the public key comprises the second decryption key. The second transaction may comprise an output field comprising the second decryption key. For example, the second transaction may comprise an address in the output field, wherein the address comprises the second decryption key. The second transaction may comprise a field to store metadata comprising the first decryption key. For example, the second transaction may comprise an OP_RETURN field comprising the first decryption key.

At step 1150, the second transaction may be caused to be stored in the distributed database. The second transaction may be caused to be stored in the distributed database by the rights holder. The second transaction may be broadcast to the distributed database. The second transaction may be added to the distributed database. For example, the second transaction may be validated by one or more nodes associated with the distributed database. The second transaction may be added to a block. The block may be added to a blockchain. The second transaction may be sent to a memory pool of the distributed database. The second transaction may be relayed or propagated by one or more nodes associated with the distributed database.

The second transaction may be accessed from the distributed database. The second identifier may be obtained from the second transaction. The second identifier may be used to locate the first transaction in the distributed database.

As an example, a surveillance company may upload an encrypted security camera video to a content server. The company may generate a first transaction for a blockchain comprising a first identifier and an encrypted message. The encrypted message may comprise a key configured to decrypt the video. The company may broadcast the first transaction across a network associated with the blockchain. The first transaction may be recorded in a block and the block may be added to the blockchain.

The company may generate a second transaction for the blockchain comprising a second identifier and a key configured to decrypt the encrypted message of the first transaction. The company may broadcast the second transaction across the network. The second transaction may be recorded in a block and the block may be added to the blockchain.

Figure 12:
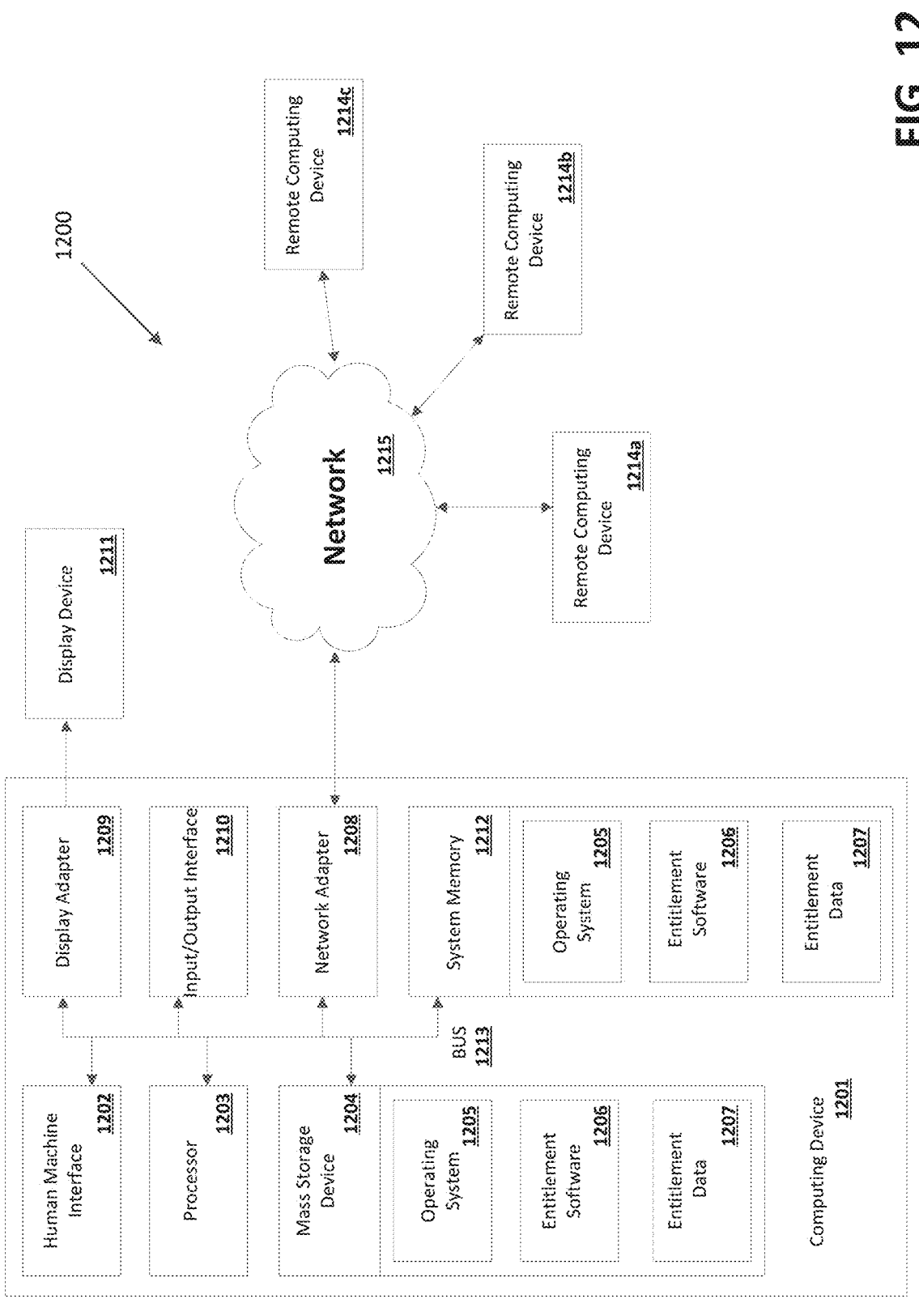
FIG. 12 is a block diagram of an example system environment.

Referring to FIG. 12, an example operating environment 1200 may comprise an example of an operating environment and is not intended to suggest any limitation as to the scope of use or functionality of operating environment architecture. Neither should the operating environment be interpreted as having any dependency or requirement relating to any one or combination of components shown in the example operating environment.

The present methods and systems may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, etc. that performs particular tasks or implements particular abstract data types. The disclosed methods may be practiced in grid-based and distributed computing environments where tasks may be performed by remote processing devices that are linked through a communications network. In a distributed computing environment, program modules may be located in both local and remote computer storage media including memory storage devices.

Further, the systems and methods disclosed may be implemented via a general-purpose computing device in the form of a computing device 1201. The components of the computing device 1201 may comprise, but are not limited to, one or more processors or processing units 1203, a system memory 1212, and a system bus 1213 that couples various system components including the processor 1203 to the system memory 1212. In the case of multiple processing units 1203, the system may utilize parallel computing.

The system bus 1213 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1213, and all buses specified in this description may be implemented over a wired or wireless network connection and each of the subsystems, including the processor 1203, a mass storage device 1204, an operating system 1205, entitlement software 1206, entitlement data 1207, a network adapter 1208, system memory 1212, an Input/Output Interface 1210, a display adapter 1209, a display device 1211, and a human machine interface 1202, may be contained within one or more remote computing devices 1214*a,b,c* at physically separate locations, connected through buses of this form, in effect implementing a fully distributed system.

The computing device 1201 typically comprises a variety of computer readable media. Example readable media may be any available media that is accessible by the computing device 1201 and comprises, for example and not meant to be limiting, both volatile and non-volatile media, removable and non-removable media. The system memory 1212 comprises computer readable media in the form of volatile memory, such as random access memory (RAM), and/or non-volatile memory, such as read only memory (ROM).

The system memory 1212 typically contains data such as entitlement data 1207 and/or program modules such as operating system 1205 and entitlement software 1206 that are immediately accessible to and/or are presently operated on by the processing unit 1203.

The computing device 1201 may comprise other removable/non-removable, volatile/non-volatile computer storage media. By way of example, FIG. 12 shows a mass storage device 1204 which may provide non-volatile storage of computer code, computer readable instructions, data structures, program modules, and other data for the computing device 1201. For example and not limitation, a mass storage device 1204 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 1204, including by way of example, an operating system 1205 and entitlement software 1206. Each of the operating system 1205 and entitlement software 1206 (or some combination thereof) may comprise elements of the programming and the entitlement software 1206. Entitlement data 1207 may be stored on the mass storage device 1204. Entitlement data 1207 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

The user may enter commands and information into the computing device 1201 via an input device (not shown). Examples of such input devices may comprise, but are not limited to, a keyboard, pointing device (e.g., a "mouse"), a microphone, a joystick, a scanner, tactile input devices such as gloves, and other body coverings, and the like These and other input devices may be connected to the processing unit 1203 via a human machine interface 1202 that is coupled to the system bus 1213, but may be connected by other interface and bus structures, such as a parallel port, game port, an IEEE 1394 Port (also known as a Firewire port), a serial port, or a universal serial bus (USB).

A display device 1211 may be connected to the system bus 1213 via an interface, such as a display adapter 1209. It is contemplated that the computing device 1201 may have more than one display adapter 1209 and the computer 1201 may have more than one display device 1211. For example, a display device may comprise a monitor, an LCD (Liquid Crystal Display), or a projector. In addition to the display device 1211, other output peripheral devices may comprise components such as speakers (not shown) and a printer (not shown) which may be connected to the computing device 1201 via Input/Output Interface 1210. Any step and/or result of the methods may be output in any form to an output device. Such output may comprise any form of visual representation, including, but not limited to, textual, graphical, animation, audio, tactile, and the like. The display 1211 and computing device 1201 may comprise part of one device, or separate devices.

The computing device 1201 may operate in a networked environment using logical connections to one or more remote computing devices 1214*a,b,c*. By way of example, a remote computing device may comprise a personal computer, portable computer, a smart phone, a server, a router, a network computer, a peer device or other common network node. Logical connections between the computing device 1201 and a remote computing device 1214a,b,c may be made via a network 1215, such as a local area network (LAN) and a general wide area network (WAN). Such network connections may be through a network adapter 1208. A network adapter 1208 may be implemented in both wired and wireless environments. Such networking environments are conventional and commonplace in dwellings, offices, enterprise-wide computer networks, intranets, and the Internet.

For purposes of illustration, application programs and other executable program components such as the operating system 1205 are shown herein as discrete blocks, although such programs and components may reside at various times in different storage components of the computing device 1201, and may be executed by the data processor(s) of the computer. An implementation of entitlement software 1206 may be stored on or transmitted across some form of computer readable media. Any of the disclosed methods may be performed by computer readable instructions embodied on computer readable media. Computer readable media may comprise any available media that may be accessed by a computer. By way of example and not limitation, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Example computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

What is claimed is:

1. A method comprising:
   receiving an identifier associated with an encrypted content asset;
   determining, based on using the identifier to locate a transaction in a distributed ledger, decryption information; and
   causing, based on using the decryption information to decrypt the encrypted content asset, output of at least a portion of the content asset.

2. The method of claim 1, wherein the content asset comprises one or more of a video, an image, an audio file, or an executable file.

3. The method of claim 1, further comprising accessing the encrypted content asset from one or more of a content server, a hosting server, a distribution server, a database server, or a content delivery network.

4. The method of claim 1, further comprising receiving an additional identifier and using the identifier to locate additional decryption information in an additional transaction of the distributed ledger, wherein the decryption information is used to decrypt a first portion of the encrypted content asset and the additional decryption information is used to decrypt a second portion of the encrypted content asset.

5. The method of claim 1, wherein the identifier comprises one or more of an input address or an output address of the transaction in the distributed ledger.

6. The method of claim 1, wherein receiving the identifier comprises receiving the identifier by a user device and based on authorization to access the content asset being granted by an entity managing the encrypted content asset.

7. The method of claim 1, further comprising receiving an indication of a plurality of portions of the encrypted content asset for output of the encrypted content asset.

8. A device comprising:
   one or more processors; and
   memory storing instructions that, when executed by the one or more processors, cause the device to:
   receive an identifier associated with an encrypted content asset;
      determine, based on using the identifier to locate a transaction in a distributed ledger, decryption information; and
      cause, based on using the decryption information to decrypt the encrypted content asset, output of at least a portion of the content asset.

9. The device of claim 8, wherein the content asset comprises one or more of a video, an image, an audio file, or an executable file.

10. The device of claim 8, wherein the instructions, when executed by the one or more processors, further cause the device to access the encrypted content asset from one or more of a content server, a hosting server, a distribution server, a database server, or a content delivery network.

11. The device of claim 8, wherein the instructions, when executed by the one or more processors, further cause the device to receive an additional identifier and use the identifier to locate additional decryption information in an additional transaction of the distributed ledger, wherein the decryption information is used to decrypt a first portion of the encrypted content asset and the additional decryption information is used to decrypt a second portion of the encrypted content asset.

12. The device of claim 8, wherein the identifier comprises one or more of an input address or an output address of the transaction in the distributed ledger.

13. The device of claim 8, wherein the instructions that, when executed by the one or more processors, cause the device to receive the identifier comprises instructions that, when executed by the one or more processors, cause the device to receive the identifier by a user device and based on authorization to access the content asset being granted by an entity managing the encrypted content asset.

14. The device of claim 8, wherein the instructions, when executed by the one or more processors, further cause the device to receive an indication of a plurality of portions of the encrypted content asset for output of the encrypted content asset.

15. A system comprising:
   an output device; and
   a computing device configured to:
   receive an identifier associated with an encrypted content asset;
      determine, based on using the identifier to locate a transaction in a distributed ledger, decryption information; and
      cause, based on using the decryption information to decrypt the encrypted content asset, the output device to output of at least a portion of the content asset.

16. The system of claim 15, wherein the content asset comprises one or more of a video, an image, an audio file, or an executable file.

17. The system of claim 15, wherein the computing device is further configured to access the encrypted content asset from one or more of a content server, a hosting server, a distribution server, a database server, or a content delivery network.

18. The system of claim 15, wherein the computing device is further configured to receive an additional identifier and use the identifier to locate additional decryption information in an additional transaction of the distributed ledger, wherein the decryption information is used to decrypt a first portion of the encrypted content asset and the additional decryption information is used to decrypt a second portion of the encrypted content asset.

19. The system of claim 15, wherein the identifier comprises one or more of an input address or an output address of the transaction in the distributed ledger.

20. A non-transitory computer-readable medium storing computer-executable instructions that, when executed, cause:

receiving an identifier associated with an encrypted content asset;

determining, based on using the identifier to locate a transaction in a distributed ledger, decryption information; and causing, based on using the decryption information to decrypt the encrypted content asset, output of at least a portion of the content asset.

21. The non-transitory computer-readable medium of claim 20, wherein the instructions, when executed, further cause accessing the encrypted content asset from one or more of a content server, a hosting server, a distribution server, a database server, or a content delivery network.

22. The non-transitory computer-readable medium of claim 20, wherein the instructions, when executed, further cause receiving an additional identifier and using the identifier to locate additional decryption information in an additional transaction of the distributed ledger, wherein the decryption information is used to decrypt a first portion of the encrypted content asset and the additional decryption information is used to decrypt a second portion of the encrypted content asset.

\* \* \* \* \*